US007167853B2

(12) United States Patent
Zaharioudakis et al.

(10) Patent No.: US 7,167,853 B2
(45) Date of Patent: *Jan. 23, 2007

(54) MATCHING AND COMPENSATION TESTS FOR OPTIMIZING CORRELATED SUBQUERIES WITHIN QUERY USING AUTOMATIC SUMMARY TABLES

(75) Inventors: Markos Zaharioudakis, Los Gatos, CA (US); Mir Hamid Pirahesh, San Jose, CA (US); Roberta Jo Cochrane, Los Gatos, CA (US); George Lapis, San Jose, CA (US); Yang Sun, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

This patent is subject to a terminal disclaimer.

(21) Appl. No.: 10/287,924

(22) Filed: Nov. 5, 2002

(65) Prior Publication Data

US 2003/0088558 A1    May 8, 2003

Related U.S. Application Data

(63) Continuation-in-part of application No. 09/502,821, filed on Feb. 11, 2000, now Pat. No. 6,847,962.

(60) Provisional application No. 60/135,133, filed on May 20, 1999.

(51) Int. Cl.
*G06F 17/30* (2006.01)
(52) U.S. Cl. ............................... 707/2; 707/5
(58) Field of Classification Search .............. 707/1–7, 707/100–102, 104.1
See application file for complete search history.

(56) References Cited

U.S. PATENT DOCUMENTS

| 5,276,870 A | | 1/1994 | Shan et al. ..................... 707/2 |
| 5,367,675 A | | 11/1994 | Cheng et al. .................. 707/2 |
| 5,544,355 A | * | 8/1996 | Chaudhuri et al. ............ 707/2 |
| 5,659,725 A | | 8/1997 | Levy et al. .................... 707/3 |
| 5,682,535 A | | 10/1997 | Knudsen ...................... 717/117 |

(Continued)

FOREIGN PATENT DOCUMENTS

EP    0797160    9/1997

(Continued)

OTHER PUBLICATIONS

Chiang Lee et al. "optimizing large join queries using a graph-based approach", IEEE transactions on knowledge and data engineering, vol. 13, No. 2, Mar./Apr. 2001, pp. 298-315.*

(Continued)

*Primary Examiner*—Srirama Channavajjala
(74) *Attorney, Agent, or Firm*—Gates & Cooper LLP

(57) ABSTRACT

A method, apparatus, and article of manufacture for optimizing database queries using an automatic summary table. A query is analyzed using matching and compensation tests between the query at least one correlated subquery within the query and the automatic summary table to determine whether expressions occurring in the query, but not in the automatic summary table, can be derived using the automatic summary table. If so, the query is rewritten so that the automatic summary table is used.

21 Claims, 17 Drawing Sheets

U.S. PATENT DOCUMENTS

| | | | |
|---|---|---|---|
| 5,737,591 A | 4/1998 | Kaplan et al. | 707/1 |
| 5,806,060 A | 9/1998 | Borgida et al. | 707/3 |
| 5,812,840 A * | 9/1998 | Shwartz | 707/4 |
| 5,822,750 A * | 10/1998 | Jou et al. | 707/2 |
| 5,848,406 A | 12/1998 | Mani et al. | 707/2 |
| 5,864,842 A | 1/1999 | Pederson et al. | 707/3 |
| 5,884,299 A | 3/1999 | Ramesh et al. | 707/2 |
| 5,897,632 A | 4/1999 | Dar et al. | 707/2 |
| 6,014,656 A * | 1/2000 | Hallmark et al. | 707/2 |
| 6,023,695 A | 2/2000 | Osborn et al. | 707/3 |
| 6,023,696 A | 2/2000 | Osborn et al. | 707/3 |
| 6,081,801 A * | 6/2000 | Cochrane et al. | 707/3 |
| 6,088,524 A | 7/2000 | Levy et al. | 707/3 |
| 6,173,292 B1 * | 1/2001 | Barber et al. | 707/200 |
| 6,199,063 B1 | 3/2001 | Colby et al. | 707/4 |
| 6,205,451 B1 * | 3/2001 | Norcott et al. | 707/204 |
| 6,249,791 B1 * | 6/2001 | Osborn et al. | 707/200 |
| 6,317,738 B1 | 11/2001 | Lohman et al. | 707/3 |
| 6,334,128 B1 * | 12/2001 | Norcott et al. | 707/5 |
| 6,339,768 B1 | 1/2002 | Leung et al. | 707/2 |
| 6,341,281 B1 | 1/2002 | MacNicol et al. | 707/3 |
| 6,411,951 B1 | 6/2002 | Galindo-Legaria et al. | 369/275.2 |
| 6,449,605 B1 | 9/2002 | Witkowski | 707/3 |
| 6,460,027 B1 | 10/2002 | Cochrane et al. | 707/2 |
| 6,496,828 B1 * | 12/2002 | Cochrane et al. | 707/10 |
| 6,510,422 B1 * | 1/2003 | Galindo-Legaria et al. | 707/3 |
| 6,513,034 B1 * | 1/2003 | Leung et al. | 707/3 |
| 6,532,470 B1 * | 3/2003 | Cochrane et al. | 707/102 |
| 6,560,594 B2 * | 5/2003 | Cochrane et al. | 707/2 |
| 6,567,802 B1 * | 5/2003 | Popa et al. | 707/3 |
| 6,581,205 B1 * | 6/2003 | Cochrane et al. | 717/140 |
| 6,708,179 B1 * | 3/2004 | Arora | 707/102 |
| 6,718,320 B1 * | 4/2004 | Subramanian et al. | 707/2 |
| 6,763,352 B2 * | 7/2004 | Cochrane et al. | 707/4 |
| 6,823,329 B2 * | 11/2004 | Kirk et al. | 707/2 |
| 6,847,962 B1 * | 1/2005 | Cochrane et al. | 707/4 |
| 2003/0088558 A1 * | 5/2003 | Zaharioudakis et al. | 707/3 |
| 2003/0167258 A1 * | 9/2003 | Koo et al. | 707/2 |
| 2004/0181521 A1 * | 9/2004 | Simmen | 707/3 |
| 2005/0097084 A1 * | 5/2005 | Balmin et al. | 707/3 |

FOREIGN PATENT DOCUMENTS

| | | | | |
|---|---|---|---|---|
| EP | 1193618 | * | 4/2002 | 17/30 |
| WO | WO 98/09238 | * | 3/1998 | 17/30 |
| WO | WO 2004072810 | * | 8/2004 | |

OTHER PUBLICATIONS

Navin Kabra et al. "efficient mid-query re-optimization of suboptimial query execution plans", SIGMOD '98, pp. 106-117.*

Randall G Bello et al. "materialized views in oracle", proceedings of the 24th VLDB conference new yourk, USA, 1998, pp. 659-664.*

Ayla Sayli et al. "A fast transformation method to semantic query optimisation", Database engineering and applications symposium, 1997 proceedings, Aug. 1997, pp. 319-326.*

Tetsuya Takahashi et al. "Implementation of object view query on a relational database",, no date, 6 pages.*

V. Markl et al. "LEO: An autonomic query optimizeer for DB2", IBM systems journal, vol. 42, No. 1 2003, pp. 98-106.*

Kenneth W.Ng et al. "dynamic query re-optimization",published 2003, 10 pages.*

Bernd Ammann et al. "Gram: A graph data model and query language", conference on Hypertext and hypermedia proceedings of the ACM conference on Hypertext, 1993, pp. 201-211.*

Jun Rao et al. "Resuing invariants: a new strategy for correlated queries", proceedings of the 1998 ACM SIGMOD international conference on Management of data, 1998, pp. 37-48.*

Bertram Ludascher et al. "Navigation-driven evaluation of virtual mediated views", EDBT 200, LNCS 17777, pp 150-165.*

Joseph M Hellerstein, "Optimization techniques for queries with expensive methods", ACM transactions on database systems, vol. 23, No. 2, Jun. 1998, pp. 113-157.*

Sergio Flesca et al. "rewriting queries using views", IEEE transactions on knowledge and data engineering, vol. 13. No. 6, 2001, pp. 980-995.*

Jonathan Goldstein et al. "optimization queries using materilaized views: a practical, scalable solution", proceedings of the 2001 ACM SIGMOD international conference on management of data, 2001, pp. 331-342.*

Bello et al., "Materialized Views in Oracle," Proceedings of the 24th VLDB Conference, NY, USA, 1998, 659-664.

Colby et al., "Red Brick Vista™: Aggregate Computation and Management," Proceedings of the 14th International Conference on Data Engineering, Orlando, Florida, 1998, 174-177.

Franz et al., LTCS-Report 98-06, "Computing the Least Common Subsumer and the Most Specific Concept in the Presence of Cyclic ALN-Concept Descriptions," Aachen University of Technology Research Group for Theoretical Computer Science, RWTH LTCS-Report, 1-33.

Lehner et al., "Fast Refresh Using Mass Query Optimization," Data Engineering, Proceedings 17th International Conference, 2001, 391-398.

Michael et al., "Automated Summary Tables and Aggregate Navigation in DB2 Universal Database," Solutions Journal, The IDUG Solutions Journal, Fall 1999, 6(3): 1-5.

Srivastava et al., "Answering Queries with Aggregation Using Views," Proceedings of the 22nd VLDB Conference Mumbai, Bombay, India, 1996, 318-329.

Zaharioudakis et al., "Answering Complex SQL Queries Using Automatic Summary Tables," SIGMOD Conference, 2000, 105-116.

* cited by examiner

MATCHING AND COMPENSATION TESTS FOR OPTIMIZING CORRELATED SUBQUERIES WITHIN QUERY USING AUTOMATIC SUMMARY TABLES

CROSS-REFERENCE TO RELATED APPLICATIONS

This application is a continuation-in-part under 35 U.S.C. §120 of and commonly-assigned U.S. Utility application Ser. No. 09/502,821, entitled "OPTIMIZING QUERIES USING AUTOMATIC SUMMARY TABLES," filed on Feb. 11, 2000, by Roberta J. Cochrane, George Lapis, Ting Y. Leung, Mark A. Paskin, Mir H. Pirahesh, Yang Sun, Monica S. Urata, and Markos Zaharioudakis, now U.S. Pat. No. 6,847,962, issued Jan. 25, 2005 which application claims the benefit under 35 U.S.C. §119(e) of and commonly-assigned U.S. Provisional application Ser. No. 60/135,133, entitled "OPTIMIZING QUERIES USING AUTOMATIC SUMMARY TABLES," filed on May 20, 1999, by Roberta J. Cochrane, George Lapis, Ting Y. Leung, Mark A. Paskin, Mir H. Pirahesh, Yang Sun, Monica S. Urata, and Markos Zaharioudakis, now abandoned, both of which applications are incorporated by reference herein.

BACKGROUND OF THE INVENTION

1. Field of the Invention

This invention relates in general to database management systems performed by computers, and in particular, to the optimization of correlated queries using automatic summary tables (ASTs).

2. Description of Related Art

Computer systems incorporating Relational DataBase Management System (RDBMS) software using Structured Query Language (SQL) interface are well known in the art. The SQL interface has evolved into a standard language for RDBMS software and has been adopted as such by both the American Nationals Standard Institute (ANSI) and the International Standards Organization (ISO).

For most RDBMS software, combinations of tables and views are used to access data stored in tables in the database. Indices are often used to improve the performance of retrieving data from tables. However, indices are generally limited to columns from base tables. Thus, indices are not seen as suitable for:

results of aggregations,
results of joins for commonly used subsets of the data, and
results of subqueries.

A view definition includes a query that, if processed, provides a temporary result table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS software is not aware that such a table is any different from any other table in the database. Moreover, this table cannot be used by an optimizer within the RDBMS software to improve performance, even though the table may contain data that would drastically improve the performance of other queries.

This leads to the notion of automatic summary tables (ASTs) or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined summary tables, the RDBMS software is now aware how the result in the AST was derived. When an arbitrarily complex query is submitted, an optimizer in the RDBMS software can now consider using the ASTs to answer the query, which is a technique that requires performing matching and compensation between the query and summary table definition.

There are extensive research activities and literature on this topic, as disclosed in the following publications, all of which are incorporated by reference herein:

1. L. S. Colby, R. L. Cole, E. Haslam, N. Jazaeri, G. Johnson, W J. McKenna, L. Schumacher, D. Wihite. Red Brick Vista: Aggregate Computation and Management. Proceedings of the 14th Int'l. Conference on Data Engineering, Orlando, Fla., 1998.

2. R. Bello, K. Dias, A. Downing, J. Feenan, J. Finnerty, W. Norcott, H. Sun, A. Witkowski, M. Ziauddin. Materialized Views In Oracle. Proceedings of the 24th VLDB Conference, New York, 1998.

3. D. Srivastava, S. Dar, H. Jagadish, A. Levy. Answering Queries with Aggregation Using Views. Proceedings of the 22nd VLDB Conference, Mumbai, India, 1996.

4. M. Zaharioudakis, R. Cochrane, G. Lapis, H. Pirahesh, M. Urata. Answering Complex SQL Queries Using Automatic summary Tables. Proceedings of the ACM-SIGMOD Conference, Dallas, Tex., 2000.

However, the current state of the art is that SQL statements with correlation can not be used in defining summary tables, and as a result, SQL queries with correlation can not be optimized using summary tables.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using an automatic summary table. A query is analyzed using matching and compensation tests between the query at least one correlated subquery within the query and the automatic summary table to determine whether expressions occurring in the query, but not in the automatic summary table, can be derived using the automatic summary table. If so, the query is rewritten so that the automatic summary table is used.

It is an object of the present invention to optimize correlated queries using automatic summary tables. More specifically, it is an object of the present invention to make the relational database management system aware how a result in an automatic summary table was derived, so that an optimizer function of the relational database management system can use the automatic summary table to respond to correlated queries. The techniques presented in the present invention involve complex and yet efficient matching and compensation tests among queries, and are directly applicable to other areas such as multiple query optimization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

1 Hardware Environment

Figure 1:
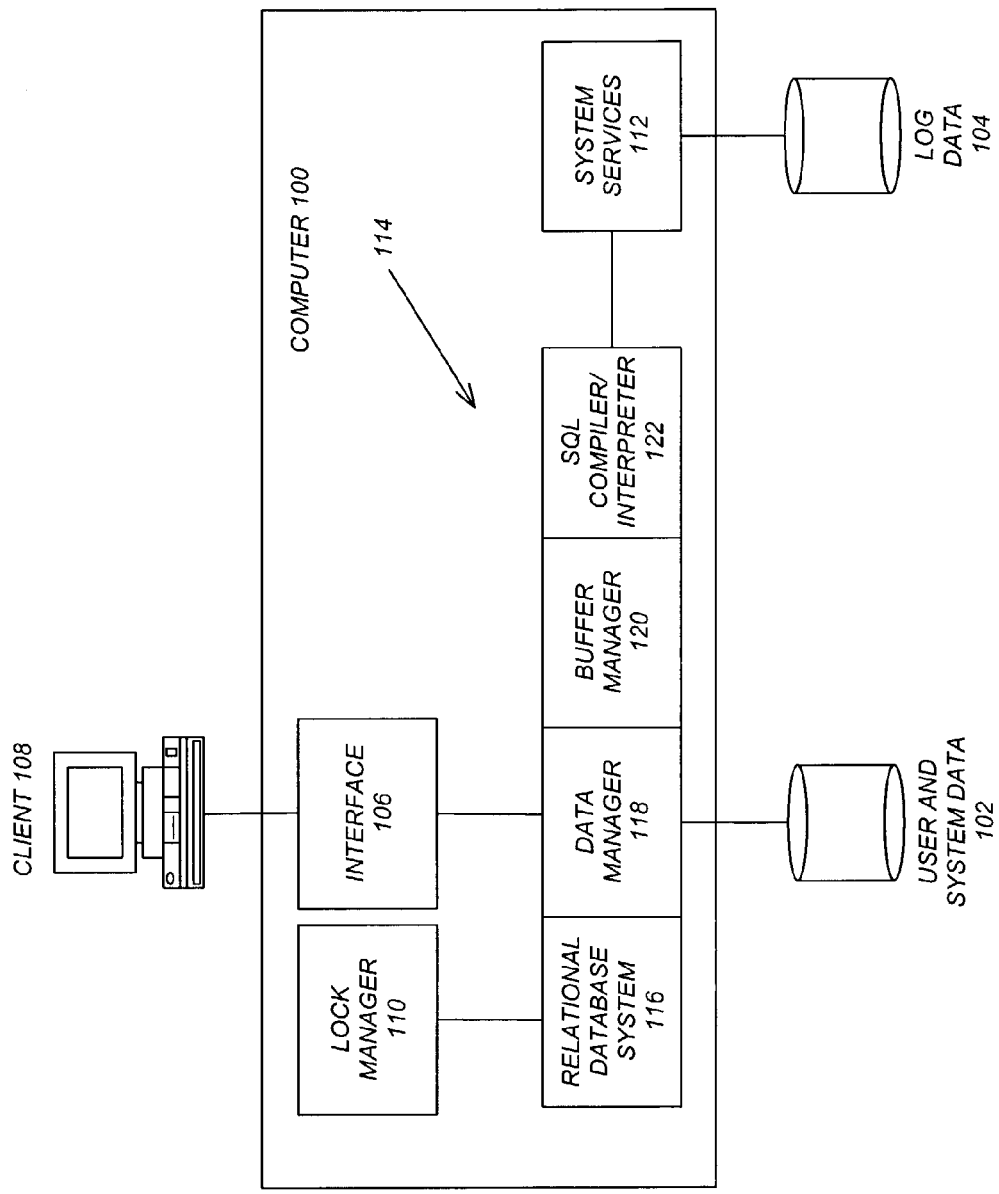
FIG. 1 illustrates an exemplary computer hardware and software environment that could be used with an embodiment of the present invention.

FIG. 1 illustrates an exemplary computer hardware and software environment that could be used with an embodiment of the present invention. In the exemplary environment, a computer system 100 is comprised of one or more processors connected to one or more data storage devices 102 and 104, such as disk drives, that store one or more relational databases.

An interface 106, such as TCP/IP, IMS/DB/DC, CICS, TSO, OS/2 or other similar interface, is used to connect a client computer 108 to the computer 100, in order that client computer 108 may transmit electrical signals to and from the computer system 100 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by I.B.M. Corporation for the MVS™, OS/2™, UNIX™, or WINDOWS NT™ operating systems. Those skilled in the art will recognize, however, that the present invention has application to any RDBMS software.

As illustrated in FIG. 1, the RDBMS software includes three major components: a Lock Manager module 110, Systems Services module 112, and Database Services module 114. The Lock Manager module 110 handles locking services, because the RDBMS software treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS architecture is the Database Services module 114. The Database Services module 114 contains several submodules, including the Relational Database System (RDS) 116, the Data Manager 118, and the Buffer Manager 120, as well as other components, such as an SQL compiler/interpreter 122. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, e.g., a memory, a data storage device, a remote device coupled to the computer 100 by a data communications device, etc. Moreover, these instructions and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

2 Interactive SQL Execution

Figure 2:
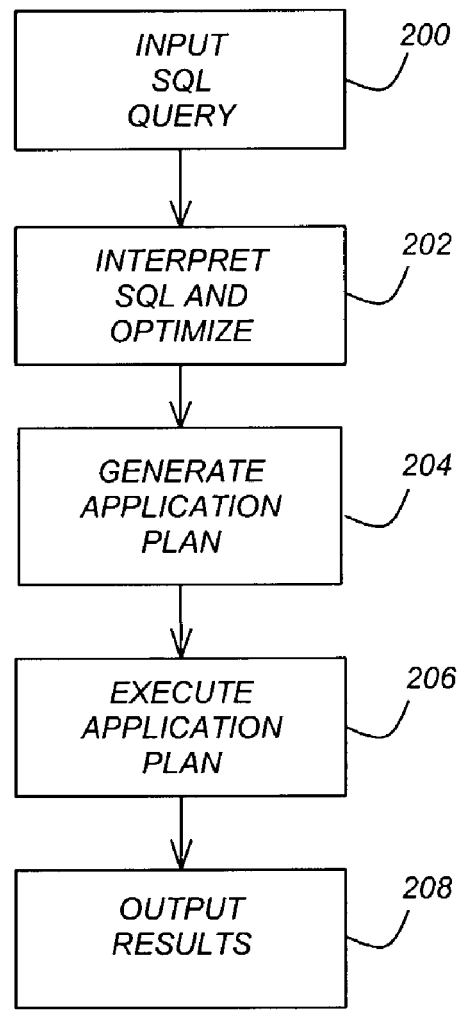
FIG. 2 is a flowchart illustrating the steps necessary for the interpretation and execution of SQL statements in an interactive environment according to an embodiment of the present invention.

FIG. 2 is a flowchart illustrating the steps necessary for the interpretation and execution of SQL statements in an interactive environment according to an embodiment of the present invention. Block 200 represents the input of SQL statements into the computer system 102. Block 202 represents the step of compiling or interpreting the SQL statements. An optimization function within block 202 may transform or optimize the SQL query in a manner described in more detail later in this specification. Block 204 represents the step of generating a set of runtime structures called an application plan from the compiled or interpreted SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in each column, etc.), to choose what it considers to be the most efficient access path for the query. Block 206 represents the execution of the application plan and Block 208 represents the output of the results.

3 Embedded/Batch SQL Execution

Figure 3:
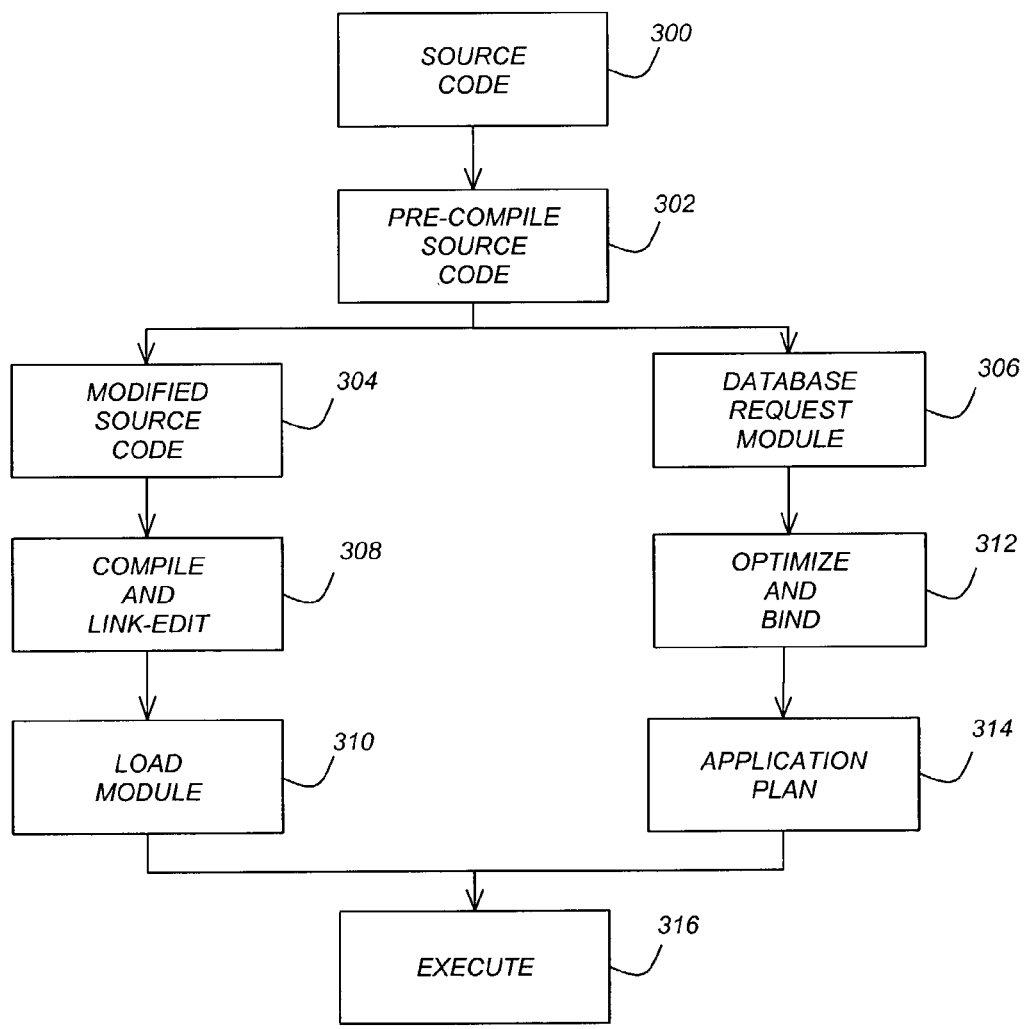
FIG. 3 is a flowchart illustrating the steps necessary for the interpretation and execution of SQL statements embedded in source code according to an embodiment of the present invention.

FIG. 3 is a flowchart illustrating the steps necessary for the interpretation and execution of SQL statements embedded in source code according to an embodiment of the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS software, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the application plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and application plan 314 are then executed together at step 316.

4 An Optimization Technique for Automatic Summary Tables

Automatic summary tables (ASTs) (also known as materialized views) are database tables that contain the precomputed results of certain SQL queries. The purpose of the optimization technique presented here is to take advantage of existing ASTs by employing a matching algorithm that determines whether the content of an AST overlaps with the content of an SQL query, and compensates for the non overlapping parts. When such an overlap exists, we say that the query and the AST match. After discovering a match, the optimizer may choose to rewrite the query so that it will access the AST instead of one or more of the base tables. The optimizer will rewrite the query if the estimated cost of the rewritten query is less than the original query.

Figure 4:
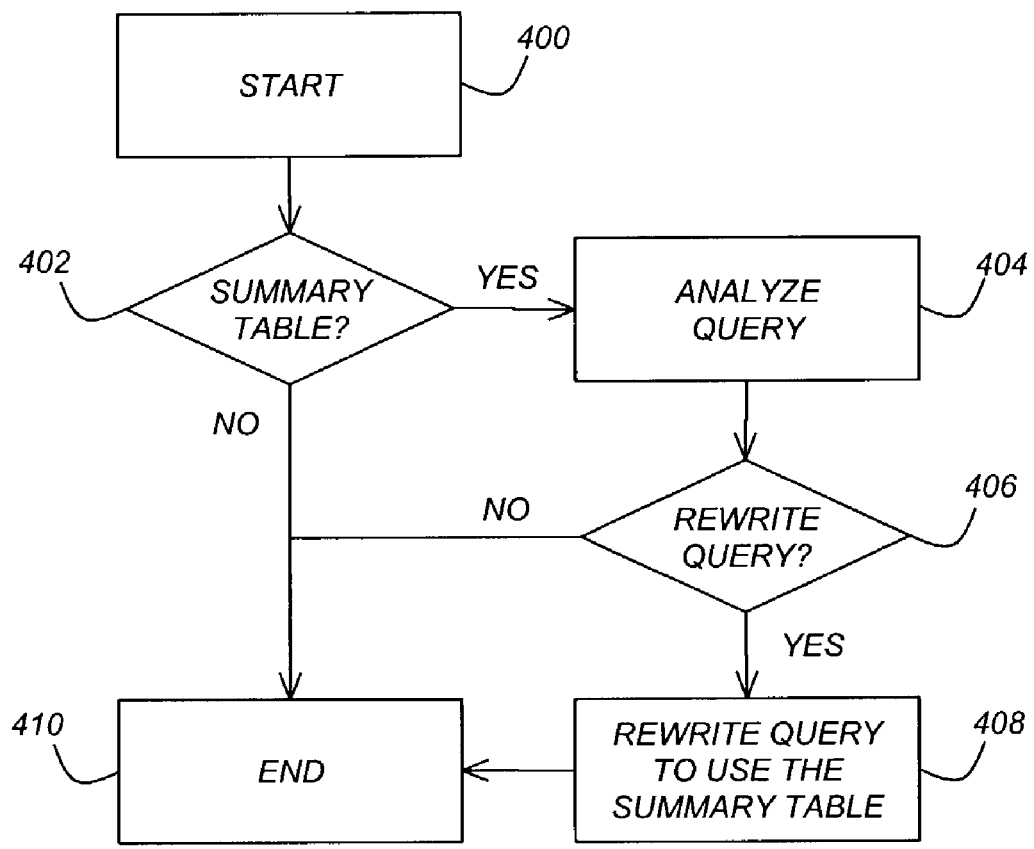
FIG. 4 is a flowchart illustrating the method of optimizing SQL queries, according to the preferred embodiment of the present invention.

This is shown in FIG. 4, which is a flowchart illustrating the method of optimizing SQL queries in step 202 of FIG. 2 and step 312 of FIG. 3, according to an embodiment of the present invention, the query being performed by the computer system to retrieve data from a database stored on the computer system 100.

Block 400 represents the start of the logic.

Block 402 is a decision block that represents the computer system 100 determining whether there are one or more of the summary tables referencing one or more tables in the query. If so, control transfers to Block 404; otherwise, control transfers to Block 410.

Block 404 represents the computer system 100 analyzing the query using matching and compensation tests between the query, at least one correlated subquery within the query and the automatic summary table to determine whether expressions occurring in the query, but not in the automatic summary table, can be derived using the automatic summary table, wherein the correlated subquery comprises an inner query block of the query that references one or more columns that appear in an outer query block of the query.

In Block 404, the analyzing step comprises the step of determining whether there is a match between the query, the correlated subquery and the automatic summary table using a bottom-up traversal of boxes in query graph models (QGMs) for the query, correlated subquery and automatic summary table that tries to establish matches between query, correlated subquery and automatic summary table, until it reaches a top of the QGM for the automatic summary table. This determining step further comprises the steps of performing a navigator function to identify candidate subsumee and subsumer pairs from the QGMs for the query, correlated subquery and automatic summary table in an order such that the bottom-up traversal of the QGMs for the query, corre- lated subquery and automatic summary table is satisfied, and performing a match function that takes as input the candidate subsumee and subsumer pair from the QGMs for the query, correlated subquery and automatic summary table, and returns information on whether the subsumee matches with the subsumer. The navigator function guarantees that before an attempt is made to match a candidate subsumee and subsumer pair, all children of the pair have been matched with each other, and the sources of any correlated input columns that are referenced in the subsumee have also been matched with all of their candidate subsumers. The match function maps a reference by the correlated subquery to a column in the outer query block to an equivalent expression in the automatic summary table, using any one of the available matches of a source of the correlated column. The match function records which match was used, and at an appropriate later stage, detects whether the match used was a correct match, and if not, backtracks and tries another match. The match function performs regrouping when it pulls up a predicate with correlated and constant columns only though a GROUP-BY subsumer that does not have any grouping columns.

Block 406 is a decision block that represents the computer system 100 determining whether the query should be rewritten to take advantage of one or more of the summary tables. If so, control transfers to Block 408; otherwise, control transfers to Block 410.

Block 408 represents the computer system 100 rewriting the query so that the automatic summary table is used. Specifically, this Block compensates complex expressions using the summary table as they are identified in Block 404, wherein the expressions can be re-derived from one or more of the columns of the summary table.

Block 410 represents the end of the logic.

Additional details concerning the various steps and functions of FIG. 4 can be found in the following description.

4.1 A Database Schema

Figure 5:
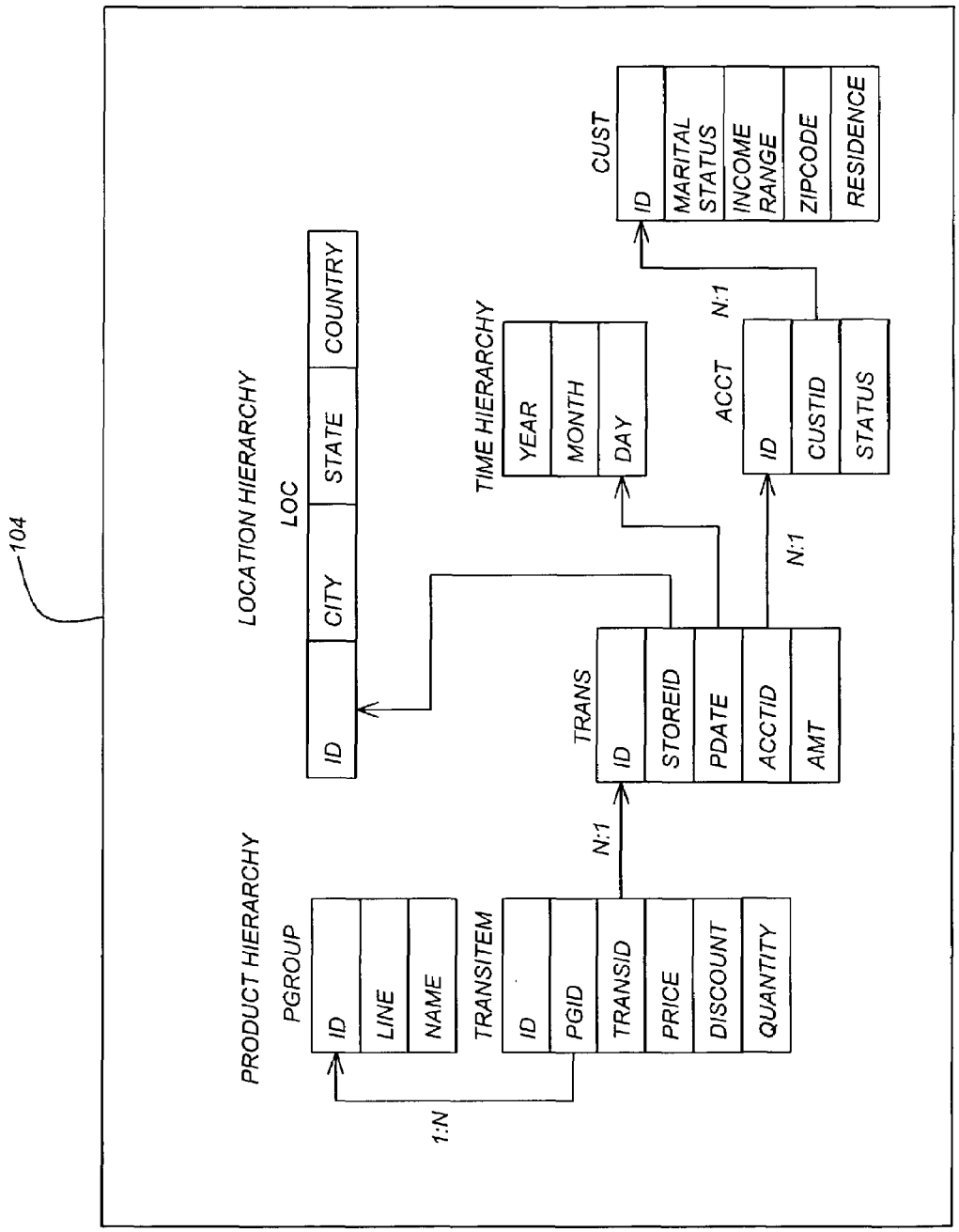
FIG. 5 illustrates a database schema used to illustrate a preferred embodiment of the present invention.

The operation of the present invention can best be understood in context, i.e., using a real-world example, such as a data warehouse application performed by the RDBMS software. Consider a credit card company storing credit card customer information, their credit card accounts, and transactions that customers made using credit cards for purchases. A possible database schema, comprising a "star" schema, is illustrated by FIG. 5 and described below:

Table CUST contains customer information.

Table ACCT contains credit card account information. Each customer may have one or more credit cards (i.e., one or more accounts).

Table LOC contains location information; the id of the store where each transaction takes place, and the city, state, and country where the store is located.

Table PGROUP contains product group information; the name of each group, and the name of the product line where the group belongs to.

Table TRANS contains transaction information. A customer may make a number of purchases using a particular credit card, and the transaction information is stored in table TRANS. Each transaction was made at a particular time and in a particular location and has a total amount. The purchase time and location can be aggregated along time and location dimensions.

Table TRANSITEM contains information about transactions on each item. In each transaction, any number of items may be purchased, and TRANSITEM stores this information and the product information can be aggregated along the product line hierarchy.

The database schema described above will be used as the basis for most of the examples presented in the rest of this document. The following "CREATE TABLE" statements may be used to create the tables shown in FIG. 5.

```
create table CUST(
    ID integer not null primary key,
    MARITAL_STATUS char(1),
    INCOME_RANGE integer not null,
    ZIPCODE integer,
    RESIDENCE varchar(5));
create table ACCT(
    ID integer not null primary key,
    CUSTID integer not null,
    STATUS integer,
    constraint CUST_ACCT foreign key (CUSTID) references CUST);
create table LOC(
    ID integer not null primary key,
    CITY varchar(10),
    STATE char(2),
    COUNTRY varchar(10));
create table PGROUP(
    ID integer not null primary key,
    NAME varchar(12),
    LINE varchar(12));
create table TRANS(
    ID integer not null primary key,
    ACCTID integer not null,
    PDATE date not null,
    STOREID integer not null,
    AMT decimal(10,2),
    constraint ACCT_TRANS foreign key (ACCTID) references ACCT,
    constraint LOC_ACCT foreign key (LOCID) references LOC);
create table TRANSITEM (
    ID integer not null primary key,
    TRANSID integer not null,
    PGID integer not null,
    PRICE decimal(10,2) not null,
    QUANTITY integer not null,
    DISCOUNT integer not null,
    constraint TRANS_TRANSITEM foreign key (TRANSID) references TRANS,
    constraint PGROUP_TRANSITEM foreign key (PGID) references PGROUP);
```

4.2 An Example of Query Optimization Based on Automatic Summary Tables

ASTs are created using the "CREATE SUMMARY TABLE" statement followed by a full-select statement. For example, the following statement creates an AST that stores the number of transactions per location and year.

```
create summary table AST1 as
(
select storeid, year(pdate) as year, count(*) as cnt
from TRANS
group by storeid, year(pdate)
)
```

Now, consider the following user query (Q1) that counts the number of transactions performed in USA per each state and year and returns the counts that are greater than 100.

Q1: select l.state, year(t.pdate), count(*)
from TRANS t, LOC l
where t.storeid=l.id and l.country='USA'
group by l.state, year(t.pdate)
having count(*)>100

Given AST1 and Q1, the matching algorithm will prove that AST1 and Q1 match, and will generate a new query (NewQ1) that is equivalent to Q1, but accesses AST1 instead of the TRANS table. This new query is as follows:

NewQ1: select l.state, a.year, sum(a.cnt)
from AST1 a, LOC l
where a.storeid=l.id and l.country='USA'
group by l.state, a.year
having sum(a.cnt)>100

Given that a typical store performs several thousands of transactions per year, AST1 is several thousands times smaller than TRANS. Therefore, using AST1 instead of TRANS in NewQ1 can improve the response time of this query significantly.

4.3 The Query Graph Model

The present invention is based on an improved optimization technique that is typically performed at step 202 of FIG. 2 or step 312 of FIG. 3. Specifically, the present invention is based on an improved SQL query compilation and optimization technique using a Query Graph Model (QGM). QGM is further described in the publication: Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

In QGM, a query is represented as a directed acyclic graph in which a node (or box) represents a table operation and an edge (or quantifier) represents a flow of records from a child (producer) box to a parent (consumer) box. The leaf boxes represent the base tables referenced by the query. Each non-leaf box produces a relational table after performing its operation on its input, which is a set of relational tables. A single root box produces the final result of the associated query. Non-leaf QGM boxes are labeled by the type of operation they perform. The two most common types are SELECT and GROUP-BY (other types include OUTER JOIN, UNION, etc.). SELECT boxes represent the select-project-join portions of queries; they apply the WHERE- or HAVING-clause predicates and compute all of the scalar (i.e., non-aggregate) expressions that appear in SELECT and GROUP-BY clauses. GROUP-BY boxes perform grouping and compute the aggregate functions.

Figure 6:
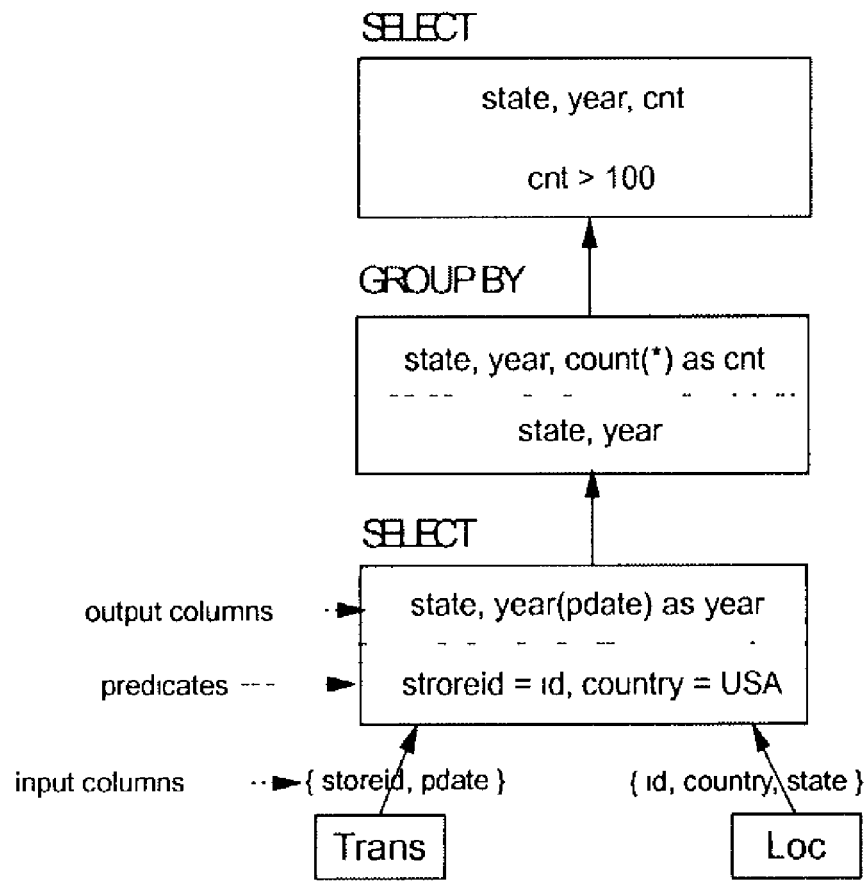
FIGS. 6–16 are block diagrams of query graph models that illustrate a preferred embodiment of the present invention.

As an example, FIG. 6 shows the QGM graph for query Q1 from Section 4.2 above. The graph consists of two base table boxes, two SELECT boxes, and one GROUP-BY box. The bottom SELECT box performs a join between the Trans and Loc base tables, as specified by the "storeid=id" join predicate, applies the selection predicate "country=USA" to the records coming from the Loc table, computes the "year (pdate)" grouping expression, and passes on the values of this expression as well the values of the "state" column to the parent GROUP-BY box. The GROUP-BY box groups its input records by "state", and "year", computes the number of records per group, and passes on the grouping columns and the computed counts to the parent SELECT box. Finally, the top SELECT box applies the HAVING predicate "cnt>100" and exports the final query result. It should be emphasized that a QGM graph represents the semantics of a query and not any particular execution plan.

As indicated by FIG. 6 and the above discussion, a QGM box is described by its type and also by its input columns, output columns, and predicates. The input columns of a box are the columns consumed by the box; their values are produced by the children of the box and flow along the quantifies that connect the box to its children. (Here, we assume no correlation. As will be shown in section 5.1 below, if a query contains correlation, then a box may consume columns that are not produced from its children.) The input columns are used, together with functions, operators, and constants, to build expressions that define the output columns and the predicates of a box. SELECT predicates may be simple selection predicates, join predicates, or selection predicates with subqueries. As a result, a SELECT box may have multiple children, which are join operands or subqueries. GROUP-BY predicates describe the groups to be created. Such grouping predicates are either simple input columns (like state and year in FIG. 6), or supergroup functions over simple input columns. GROUP-BY boxes have a single child always. The output columns of a box are the columns produced by the box itself. For SELECT boxes, output-column expressions can be arbitrarily complex as long as they do not contain any aggregate functions. The reverse is true for GROUP-BY boxes; their output columns include all of their grouping input columns, plus a number of aggregate functions over simple input columns. Given that, for every GROUP-BY box, all of its grouping input columns are output columns as well, such columns are referred to simply as grouping columns.

The shorthand QGM notation for input and output columns is QNCs and QCLs, respectively. It should be noted that a given QCL may be consumed by multiple parent boxes, and hence, there is a 1:N relationship between QCLs and QNCs. In other words, it can said that QNCs are the "carriers" of the data values that are produced by the QCLs. The precise relationships between boxes, quantifiers, QCLs and QNCs are as follows:

QCLs belong to boxes (1:N relationship between boxes and QCLs).

QNCs belong to quantifiers (1:N relationship between quantifiers and QNCs).

If Q is a quantifier that connects child box C with parent box P, and X is a QNC that belongs to Q, then X carries from C to P the values of some QCL A that belongs to C (1:N relationship between QCLs and QNCs). Box C is called the source of QNC X, and box P is called the parent of X.

4.4 The Matching Algorithm for Non-Correlated Queries and ASTs

The present invention is based on a matching algorithm for non-correlated queries. This algorithm is described in the publication: M. Zaharioudakis, R. Cochrane, G. Lapis, H. Pirahesh, M. Urata, "Answering Complex SQL Queries Using Automatic Summary Tables," Proceedings of the ACM-SIGMOD Conference, Dallas, Tex., 2000, which is incorporated by reference herein. This section provides an overview of the main concepts of this matching algorithm.

Figure 7:
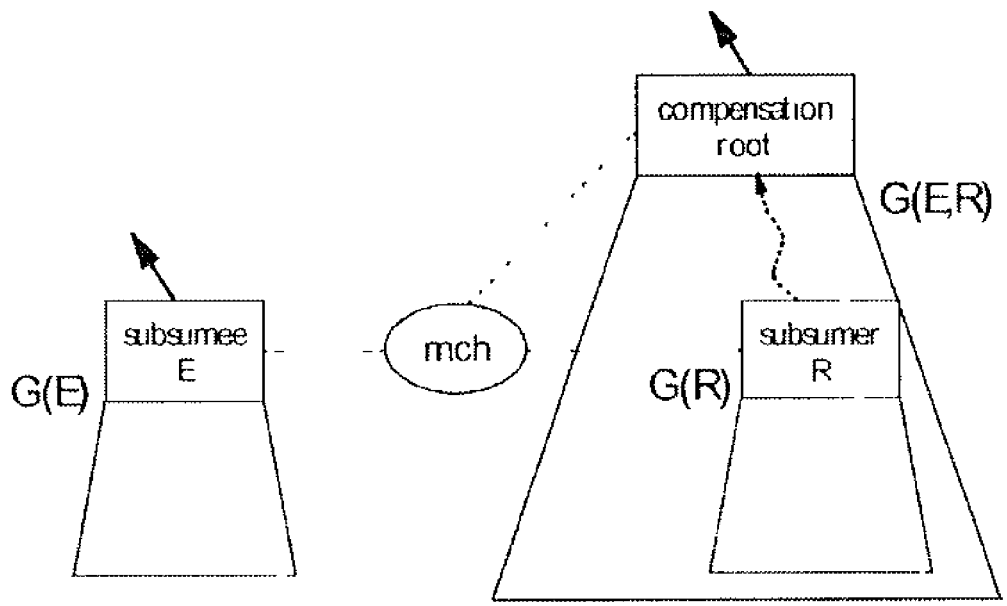

The matching algorithm is based on the idea of matching pairs of QGM boxes. In general, a box E matches with another box R, if and only if a QGM graph G(E,R) can be constructed such that G(E,R) contains the subgraph G(R) rooted at R, and G(E,R) is semantically equivalent to the subgraph G(E) rooted at E, i.e., G(E,R) and G(E) always produce the same result. If box E matches with box R, then G(E,R)−G(R) is the compensation, that is, the set of boxes that describe the operations that have to be performed on the output of R in order to get the same output as E. A graphical representation of this definition is shown in FIG. 7. If the compensation is empty, the match is exact and boxes E and R are equivalent; otherwise, box E is equivalent to the root box of the compensation. Obviously, a non-exact match relationship is asymmetric. To distinguish the different roles of the two boxes in such a relationship, E is known as the subsumee and R is known as the subsumer. (This naming is due to the fact that if E matches with R, then it is often (but not always) the case that the output of R contains all the information needed to derive the output of E, and hence R subsumes E.)

Having defined the match relationship, the matching algorithm is presented, starting with its two main components: a match function and navigator function, both of which are components of the optimizer function found in the RDBMS software. The match function takes as input two QGM boxes and determines whether they match. If a match is established, the match function also returns information that describes the compensation (as shown in FIG. 7, all information about a match is stored in a data structure called mch, which relates the subsumee, the subsumer, and the compensation boxes). Ideally, the match function should implement the definition of the match relationship given above. However, this definition is too general to be of practical use. (In fact, this definition can be trivially satisfied for every kind of boxes (using a NOT EXISTS predicate)). In reality, the match function tries to approximate the match definition in meaningful and practical ways using sufficient matching conditions. It does so by considering only certain simple, but general, graph patterns. Such patterns consist of the given subsumee and subsumer boxes, as well as the compensation boxes for the matches between the children of the subsumee and subsumer. For each pattern, the match function tests a number of conditions to determine if a match can be established.

The match function is driven by the navigator function. The navigator function scans the query and AST graphs in a bottom-up fashion, identifying potential pairs of matching boxes (where the subsumee comes from the query graph and the subsumer comes from the AST graph), and invoking the match function on such pairs, until the root AST box is matched (if possible) with one or more query boxes. To perform its task, the navigator function first initializes a set of candidate subsumee/subsumer pairs by forming all of the pairs between the leaf nodes of the query and AST graphs. During each iteration, the navigator function removes a pair from this set and passes it to the match function. If a match is established, the navigator function forms all of the pairs between the parents of the subsumee and the subsumer. The order in which the candidate box pairs are processed is important. Specifically, the navigator function ensures that during each invocation of the match function, the children of the two input boxes have been matched already, i.e., the match function has been invoked on each pair-wise combination of the children. Furthermore, the match function knows the compensation for the matches between the child boxes, because the navigator function retains this information after each successful match. As a result, the match function does not have to look at the whole subgraphs of the given subsumee and subsumer boxes; it needs to concentrate on the current pattern only, i.e., the subsumee, the subsumer, and the child compensation boxes. This design point is crucial for modularity and extensibility.

4.4.1 An Example of Matching Non-Correlated Queries

Figure 8A:
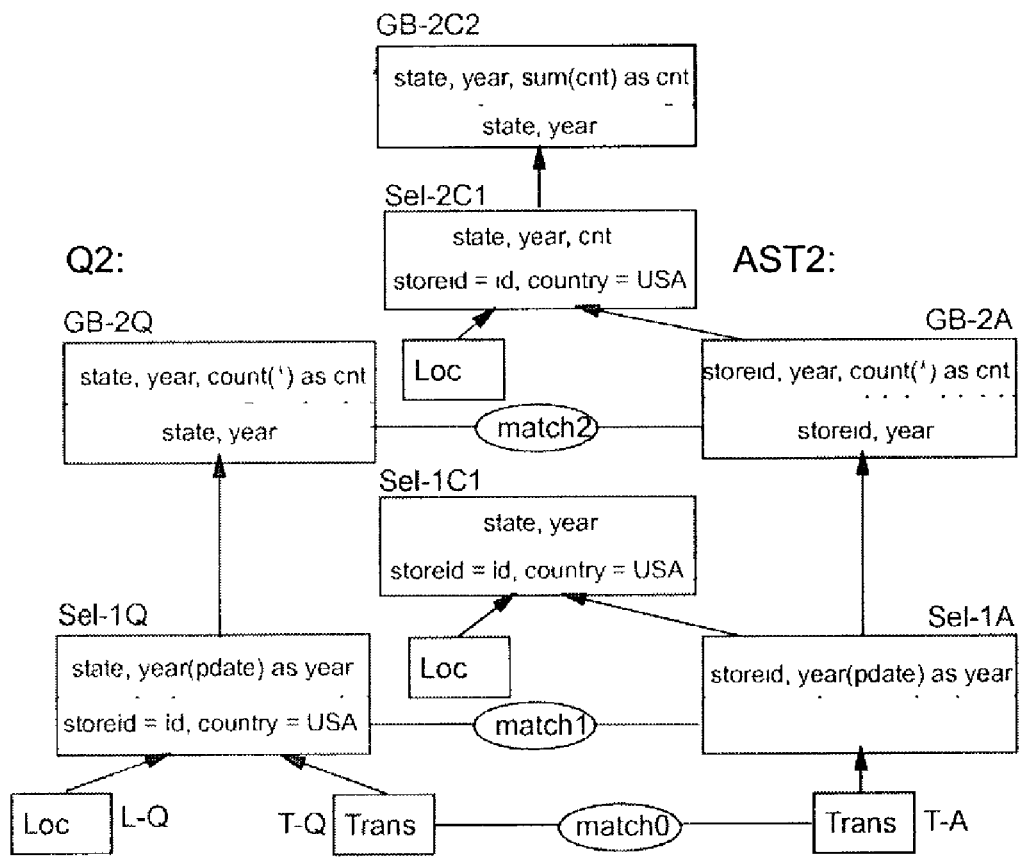

The publication: M. Zaharioudakis, R. Cochrane, G. Lapis, H. Pirahesh, M. Urata, "Answering Complex SQL Queries Using Automatic Summary Tables," Proceedings of the ACM-SIGMOD Conference, Dallas, Tex., 2000, which is incorporated by reference herein, contains an extensive list of patterns that can be handled by the match function, and states the matching conditions and compensations that are applicable to each pattern. Instead of repeating this list here, a single example is presented that illustrates the main points of this previous work. This example is shown in FIG. 8A, where user query Q2 is matched with AST2.

Q2: select 1.state, year(t.pdate) as year, count(*) as cnt
from TRANS t, LOC 1
where t.storeid=1.id and 1.country=USA
group by 1.state, year(t.pdate)
AST2: select storeid, year(pdate) as year, count(*) as cnt
from TRANS
group by storeid, year(pdate)

Figure 8B:
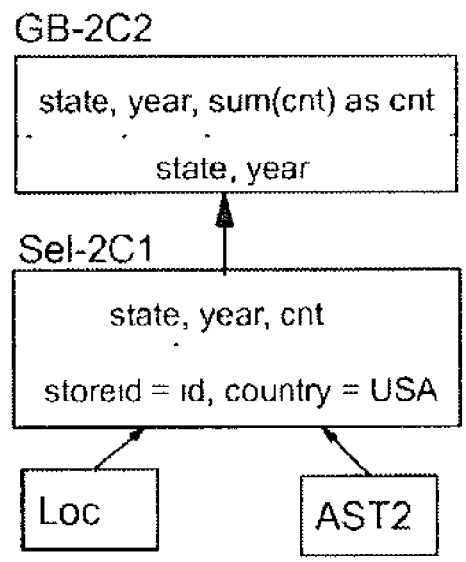

The result of this matching is a new query, newQ2, which is shown in FIG. 8B:

newQ2: select 1.state, a.year, sum(a.cnt) as cnt
from AST2 a, LOC 1
where a.storeid=1.id and 1.country=USA
group by 1.state, a.year The new query newQ2 is equivalent to Q2, but accesses AST2 instead of TRANS. Intuitively, this match is possible because both the query and the AST perform grouping and aggregation along the same dimensions (time and location) of the same fact table (TRANS), and the AST groups at a finer granularity than the query. In other words, the store-level yearly counts of the AST are partial counts for the state-level yearly counts of the query, and as a result, the state-level counts can be derived by summing over the store-level counts. In the remainder of this section, the steps taken by the matching algorithm to derive this match are described.

In FIG. 8A, boxes L-Q, T-Q, Sel-1Q, and GB-2Q comprise the QGM graph of Q2, whereas boxes T-A, Sel-1A, and GB-1A comprise the QGM graph of AST2. As mentioned earlier, the matching algorithm operates on the QGM graphs in a bottom-up order, and thus it first tries to match the base tables of the query and the AST graphs. Base tables are matched by their names, and as a result, a match between T-Q and T-A is established first (match0).

Since boxes T-Q and T-A are matched, their parents, i.e., Sel-1Q and Sel-1A become eligible for matching. In this case, the pattern consists of Sel-1Q (the subsumee), Sel-1A (the subsumer), and one rejoin child (L-Q) (where a rejoin child is defined as a child of the subsumee that does not match with any of the children of the subsumer). The matching conditions for this pattern are as follows:

(1) Every predicate of the subsumee must match (i.e., be equivalent) with some predicate (or set or predicates) in the subsumer, or be derivable from the output columns of the subsumer and/or the output columns of the rejoin children. This condition is based on the fact that join and local selection predicates are commutative, associative, and distributive among themselves. In other words, they can be applied in any order. As a result, any predicate that is not already applied by the subsumer, can be applied in a compensating SELECT box over the subsumer, as long as the subsumer preserves at its output the necessary columns to reconstruct the predicates.

(2) Every subsumer predicate must match with (or subsume) some subsumee predicate. This condition guarantees that the subsumer does not eliminate any rows that are needed in deriving the output of the subsumee.

(3) Every subsumee output column must be derivable from the output columns of the subsumer and/or the output columns of the rejoin children. This condition guarantees that the subsumer does not eliminate any columns that are needed in deriving the output of the subsumee.

Condition (2) is trivially satisfied in the example, as the subsumer does not have any predicates. Condition (1) is satisfied, because the columns referenced in the subsumee's predicates (t.storeid, 1.id, and 1.country) are either rejoin columns (1.id and 1.country) or are preserved at the output of the subsumer (t.storeid), and as a result the predicates are derivable. By the same logic, condition (3) is also satisfied. As a result, a match between Sel-1Q and Sel-1A is established (match1). However, this match is not exact, because the subsumee's predicates do not appear in the subsumer and, as a result, they must be re-applied to the output of the subsumer. This leads to the compensation box Sel-1C1, which rejoins the subsumer with the LOC table and re-applies the 'country=USA' predicate.

Next, the two GROUP-BY boxes (GB-1Q and GB-1A) become eligible for matching. In this case, the pattern consists of two GROUP-BY boxes (GB-2Q as the subsumee and GB-2A as the subsumer), and a child compensation box that is a SELECT box with rejoin (Sel-1C1). The matching conditions and associated compensation for this pattern are as follows:

(1) Every subsumee grouping column must be derivable from the subsumer grouping columns and/or the rejoin columns.

(2) Every subsumee aggregate output column is derivable from the subsumer's aggregate QCLs.

(3) Pullup condition: every predicate in the child compensation SELECT box is derivable from the subsumer grouping columns and/or the rejoin columns.

(4) Compensation: The compensation for this pattern consists of (a) a copy of the child compensation (This is called "pulling up" the child compensation (box Sel-2C1)) that performs the rejoin over the subsumer and reapplies the query WHERE predicates that were not applied by the AST, and (b) a GROUP-BY box (GB-2C2) that regroups over the partial groups of the subsumer, using the grouping columns of the subsumee. The GROUP-BY box is redundant if (a) the subsumee and the subsumer have exactly the same grouping columns, or no grouping columns at all, and (b) the SELECT child compensation does not perform any rejoins, or each rejoin is a 1:N join with the (intermediate) result of the join of the non-rejoin tables.

Condition (1) guarantees that each group formed by the subsumer is a subgroup for exactly one of the groups formed by the subsumee. That is, there is a N:1 relationship between the subsumer groups and the subsumee groups, and the subsumee groups can be derived by regrouping over the subgroups of the subsumer. Condition (2) makes sure that the aggregate functions computed by the subsumer can be used to derive the aggregate functions of the subsumee during the regrouping. Finally, condition (3) makes sure that the subsumer preserves at its output the necessary columns for pulling up the child compensation.

In the publication: M. Zaharioudakis, R. Cochrane, G. Lapis, H. Pirahesh, M. Urata, "Answering Complex SQL Queries Using Automatic Summary Tables," Proceedings of the ACM-SIGMOD Conference, Dallas, Tex., 2000, an explanation is provided why these matching conditions and associated compensation are correct. In summary, what must be proven is that it is correct to pullup the rejoin and the other extra query predicates above the partial grouping that is performed by the subsumer, and before the final (higher granularity) grouping of the subsumee.

In the example, condition (1) is satisfied, because the "year" grouping column in GB-2Q is a grouping column in GB-2A as well, and the "state" grouping column in GB-2Q is a rejoin column (i.e., it comes from the LOC table, which is a rejoin table). Condition (2) is also satisfied; in particular, the count(*) output column of GB-2Q is derived by summing over the count(*) output column of GB-2A. Finally, it is easy to see that condition (3) is also satisfied. As a result match2 is established. The compensation for this match includes a SELECT box (Sel-2C1, which is the pulled-up version of Sel-1C1), followed by a GROUP BY box (GB-2C2) that re-groups by the subsumee's grouping columns and derives the subsumee's count function.

According to the definition of the matching relationship, the establishment of match2 implies that GB-2Q is equivalent to GB-2C2 (the root box of the match2 compensation). As a result, GB-2Q and its subgraph can be replaced with GB-2C2 and its own subgraph. Furthermore, since GB-2A is the root of the AST2 graph, the AST2 graph can be collapsed into a single base-table box representing the stored content of AST2. This way, Q2 is rewritten into a new query (NewQ2) that accesses AST2 instead on TRANS, as shown in FIG. 8B.

4.4.2 Expression Translation

The example in the previous section indicates that a central issue in matching is how to compare expressions (predicates and output columns) in the query graph with expressions in the AST graph. Such comparisons are necessary to check whether two expressions match or one expression is derivable from one or more other expressions. However, it is not possible to directly compare a subsumee expression E_exp with a subsumer expression R_exp, because their input columns (QNCs) originate from completely different subgraphs, and as a result, they are not comparable. (Using their symbolic names to compare QNCs from different graphs does not work because the names assigned to derived QNCs, i.e., QNCs coming from non base-table boxes, are arbitrary.) The solution is to translate E_exp into an equivalent expression E_exp' that is valid within the subsumer's context, i.e., uses subsumer QNCs. Then, E_exp' is compared with R_exp by comparing their parse trees. Translation is done by translating each subsumee QNC that is referenced in E_exp into an equivalent subsumer QNC, or more generally, into an equivalent subsumer expression.

When the subsumee and subsumer children match exactly, translating E_exp to E_exp' is easy. Specifically, for each QCL X produced by a non-rejoin subsumee child, there is an equivalent QCL Y produced by the subsumer's matching child. As a result, if XE is a subsumee QNC that consumes X and appears in E_exp, and the subsumer consumes Y (i.e., the subsumer has a QNC YR), then XE in E_exp can be replaced with its equivalent YR QNC. By replacing each non-rejoin QNC of E_exp with its equivalent subsumer QNC (if it exists), the E_exp' expression is obtained. Notice that rejoin QNCs are never translatable because they come from subsumee children that do not have matching subsumer children. If E_exp contains any rejoin QNCs, then these are just copied over in E_exp'. As a result, a subsumee expression with rejoin QNCs will never be equivalent to any subsumer expression, but it may be derivable from the subsumer's columns and the rejoin QNCs.

Translating QNCs is more complicated when the children do not match exactly. This is best illustrated by an example. In particular, the example of FIG. 8 can be extended by adding a HAVING predicate "count(*)>2" to both the query and the AST as follows:

Q3: select l.state, year(t.pdate) as year, count(*) as cnt
from TRANS t, LOC l
where t.storeid=l.id and l.country=USA
group by l.state, year(t.pdate)
having count(*)>2

AST3: select storeid, year(pdate) as year, count(*) as cnt
from TRANS
group by storeid, year(pdate)
having count(*)>2

Figure 9:
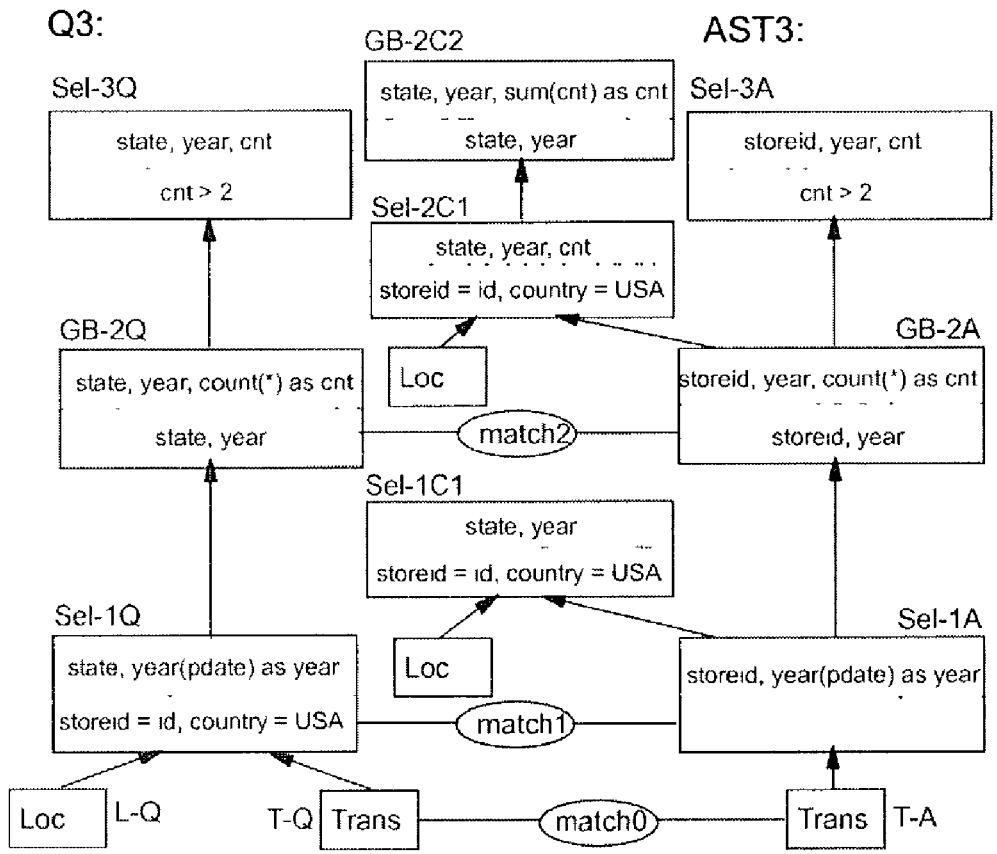

FIG. 9 shows the extended QGM graphs for Q3 and AST3. As shown, the HAVING predicates appear inside two new SELECT boxes (SEL-3Q and SEL-3A for the query and the AST, respectively) above the GROUP BY boxes. However, a match between SEL-3Q and SEL-3A is impossible because their predicates are not semantically equivalent, even though they are syntactically equivalent. The problem is illustrated in Table 1, which shows sample values for the storeid and date columns, and the corresponding AST and query results.

TABLE 1

|  | Storeid/state | Date | Cnt |
|---|---|---|---|
| Sample Trans Table (storeid, state and date columns) | 1/CA | Jan. 03, 1990 | |
| | 1/CA | Feb. 10, 1990 | |
| | 1/CA | Apr. 12, 1990 | |
| | 2/CA | Oct. 20, 1990 | |
| AST Result | 1 | 1990 | 3 |
| Query Result | CA | 1990 | 4 |

It can be seen that the HAVING predicate causes the AST to lose information: the group (2, 1990), which is necessary to produce the correct query result, has been eliminated from the AST.

Figure 10:
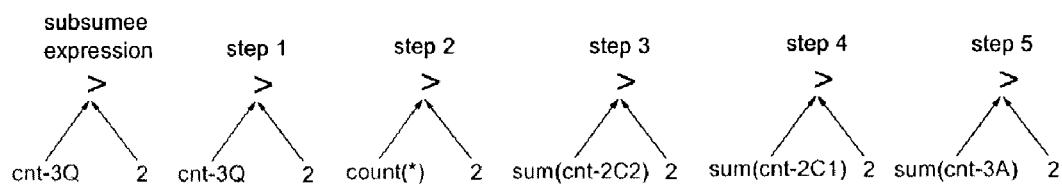

The present invention is able to detect this semantic inequivalence between the two HAVING predicates by appropriately translating the query predicate. The steps taken during this translation are shown in FIG. 10.

To ease the presentation, each QNC name is annotated with the name of the box that contains the QNC. The translation begins by creating a copy of the whole expression (step 1). Then, each QNC is translated in turn. To translate a QNC, the system first finds the child box that produces the QNC and replaces the QNC with the associated QCL expression. In the example, cnt-3Q is produced by the count(*) expression in box GB-2Q (step 2). The next step is to replace the count(*) expression with its equivalent QCL expression at the top of the child compensation. Thus, count(*) is translated as sum(cnt-2C2) (step 3). Then, the system recursively translates each new QNC (except QNCs that are produced by rejoin children) until the system reaches the bottom of the child compensation. This way, sum(cnt-2C2) is translated as sum(cnt-2C1) (step 4), where cnt-2C1 is produced by the "cnt" QCL of the subsumer's child. The last step is to check whether the, subsumer also consumes this "cnt" QCL. It does, and hence, the system can replace cnt-2C1 with the equivalent cnt-3A subsumer QNC (step 5). The fully translated expression is sum(cnt-3A)>2, which is obviously not the same as the subsumer's expression cnt-3A>2. Notice that steps (2) and (3) in the above translation depend on the fact that each subsumee QNC comes from a child of the subsumee, and each subsumee child has at least one matching subsumer child, or is rejoin child.

The translation method described above is also the first step in deriving a subsumee expression E_exp from the subsumer's QCLs. After translating E_exp to E_exp', derivabilty can be established by making sure that the subsumer computes at its output certain necessary subexpressions of E_exp' (or even the entire E_exp').

5 An Optimization Technique for Correlated Queries

5.1 The Query Graph Model for Queries with Correlation

Queries with correlation are multi-block queries where an inner query block (i.e., a subquery) references one or more columns that appear in outer query blocks. In QGM terms, this implies that at least one subquery box contains references to QNCs that do not come from the children of that box, but from other boxes in outer query blocks. An example is shown in FIG. 11.

Figure 11:
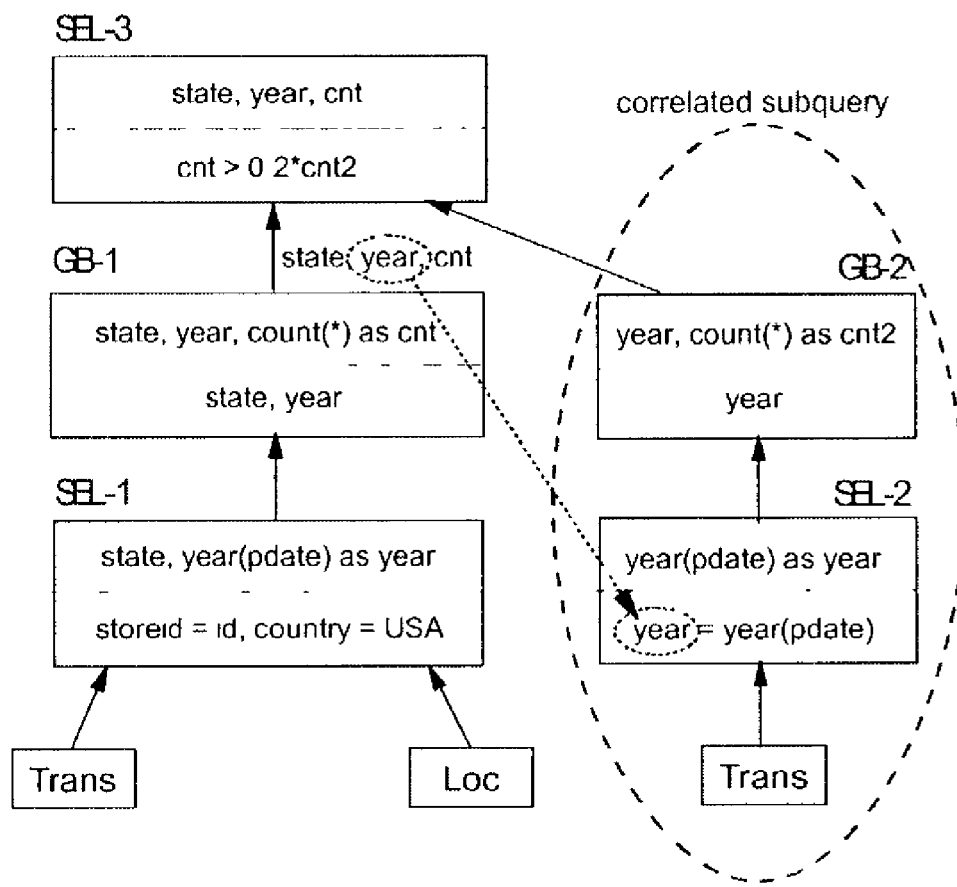

FIG. 11 illustrates a query that finds U.S. states and years with a number of transactions per state and year that is at least 20% of the total number of transactions for the same year. The SQL statements for this query are as follows:

```
select 1.state, year(t.pdate) as year, count(*) as cnt
from TRANS t, LOC 1
where t.storeid=1.id and 1.country=USA
group by year(t.pdate), 1.state
having count(*)>0.2*
    (select count (*)
    from TRANS tt
    where year(tt.pdate)=year(t.pdate)
    group by year(tt.pdate))
```

In the above SQL statements, the second select within the parentheses is a correlated subquery.

As shown in FIG. 11, the "year" column that is produced by the GROUP BY box in the outer query block (GB-1), is referenced inside the SELECT box of the correlated subquery (SEL-2). To be more precise, SEL-2 references the "year" QNC that flows between GB-1 and SEL-3. In general, if a QNC X is referenced by a box Q that is not the parent of X, then it can be said that there is a correlation between Q and X, and this relationship is denoted as corr(Q, X). The quantifier that carries X is called the source of the correlation, and the parent box of this quantifier is called the parent of the correlation. Given the SQL semantics about correlation, the following property holds:

Correlation property: if corr(Q, X), then all the paths from box Q to the root of the QGM graph pass through the parent of QNC X.

5.2 The Matching Algorithm for Correlated Queries and ASTs

To allow the bottom-up matching algorithm to handle correlated subqueries, three extensions are required. These extensions are described below.

5.2.1 Extending the Bottom-Up Navigator Function

As explained in section 4.4.2 above, a crucial step in the matching algorithm is the translation of subsumee QNCs into equivalent subsumer expressions. Furthermore, it will be noted that this translation depends on the fact that each subsumee QNC comes from a child of the subsumee, and each subsumee child has at least one matching subsumer child, or is a rejoin child. In other words, the following property holds.

QNC translation property: For each subsumee QNC, the system can find an equivalent subsumer expression, or the system determines that no equivalent expression exists.

This property is enforced by the navigator function, which guarantees that before an attempt is made to match a candidate subsumee/subsumer pair, all the children of this pair have been matched with each other (successfully or not). However, in the presence of correlation, a subsumee box Q may reference correlated QNCs, which do not originate from its children. In this case, the system wants to ensure that, in addition to the children of Q, the boxes that produce the correlated QNCs that are referenced in Q are also matched before Q is matched. Then, the above property holds, and the QNC translation mechanism can work as is. One way to guarantee this property is to extend the navigator function as described below.

First, for any box Q, let CORR(Q) be the set of boxes that produce the correlated QNCs referenced by Q. (Of course, if Q does not contain any correlated references, then CORR (Q) is empty). Then, for any non-leaf box Q, the level of Q is defined as follows:

Level(Q)=1+max{level(R), where R is a child box of
    Q or R belongs to CORR(Q)}

The level of leaf boxes is initialized to 0, and then the levels of the other boxes can be computed recursively from the above formula. After computing the levels of each box in the query and the AST graphs, the navigator function initializes an ordered list of candidate subsumee/subsumer pairs by forming all of the pairs between the leaf boxes of the query and AST graphs. The order is determined by the level of each pair of candidate subsumee/subsumer, where the level of the pair is the maximum of the levels of the subsumee and the subsumer. The list is maintained in ascending level order. During each iteration, the navigator function removes the first pair from this list and passes it to the match function. If a match is established, the navigator function forms all of the pairs between the parents of the subsumee and the subsumer and places them in the list, maintaining the order defined above. With this extension, the navigator function guarantees the following property, which is equivalent to the above QNC translation property.

Bottom-up navigation property: Before an attempt is made to match a candidate subsumee/subsumer pair, all the sources of the QNCs that are referenced by the subsumee have been matched (successfully or not) with all of their own potential subsumers.

Figure 12:
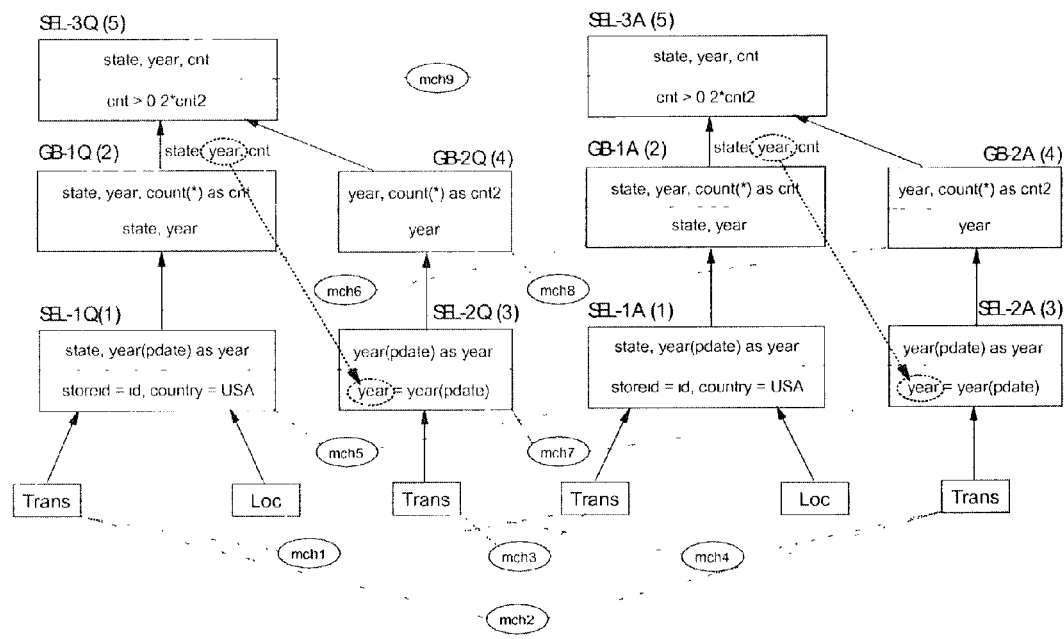

As an example, consider how the query from section 5.1 above can be matched with itself FIG. 12 shows the identical graphs for the query and the AST. Each box in FIG. 12 has been annotated with its computed level. The navigator function will first match the TRANS base table at the leaf level, thus forming matches 1, 2, 3 and 4 (labeled as mch1, mch2, mch3, and mch4, respectively, in FIG. 12). After these matches are done, the following pairs (and their associated levels) will be in the navigator function's ordered list: (SEL-1Q, SEL-1A, 1), (SEL-1Q, SEL-2A, 3), (SEL-2Q, SEL-1A, 3), (SEL-2Q, SEL-2A, 3). The first of these pairs will lead to match 5 (labeled as mch5 in FIG. 12), after which the list will be as follows: (GB-1Q, GB-1A, 2), (SEL-1Q, SEL-2A, 3), (SEL-2Q, SEL-1A, 3), (SEL-2Q, SEL-2A, 3). Given this list, the two GROUP BY boxes are the next to be matched, resulting in match 6 (labeled as mch6 in FIG. 12) and the following list: (SEL-1Q, SEL-2A, 3), (SEL-2Q, SEL-1A, 3), (SEL-2Q, SEL-2A, 3) (SEL-3Q, SEL-3A, 5). The next two pairs in the list will fail to match. Thus, the system reaches to the match between SEL-2Q and SEL-2A. In order to match these two boxes, the system must translate the predicate in SEL-2Q into an equivalent predicate in SEL-2A and compare it with the local predicate there. This, in turn, requires the translation of the correlated "year" QNC that is referenced in SEL-2Q. This "year" QNC originates from GB-1Q, which matches exactly with GB-1A. As a result, the year QNC from GB-1Q is equivalent to the year QNC from GB-1A, which is the QNC referenced in SEL-2A predicate. Similarly, the "pdate" QNCs in the two boxes are equivalent, and as a result, the two boxes match in match 6. After match 6, the navigator function's list is (GB-2Q, GB-2A, 4), (SEL-3Q, SEL-3A, 5). These two last pairs also match exactly, leading to a rewrite of the original query into a simple "select* from AST".

5.2.2 Translating Correlated QNC References

Figure 13:
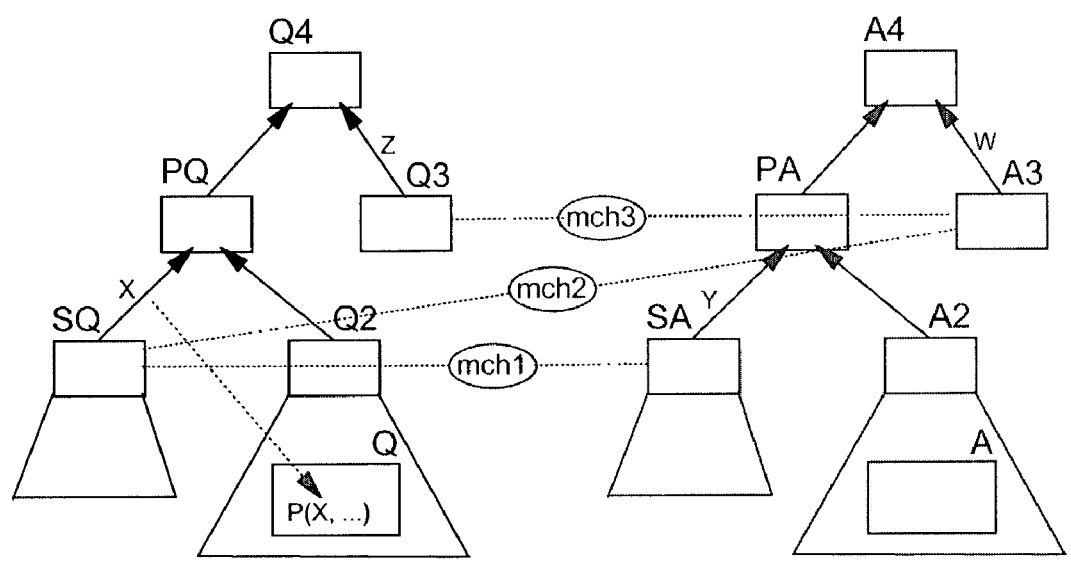

The navigator function makes it possible (using the method of section 4.4.2 above) to map a correlated reference to QNC X in the query to an equivalent AST QNC Y (or more generally, to an equivalent AST expression). However, although X and Y are indeed equivalent (i.e., they represent the same set of values), they may not be interchangeable within the context of a particular correlated expression. This is illustrated in the example of FIG. 13. As shown, the QNC X in the query is referenced via correlation in predicate P of box Q. The AST has a structure similar to the query and it may or may not have correlation. Furthermore, box SQ (which is the source of the correlation in the query) matches with both boxes SA and A3 of the AST. When an attempt is made to match boxes Q and A, the system can use either match 1 or match 2 (labeled as mch1 and mch2, respectively, in FIG. 13) to translate X to either Y or W. respectively. However, it would be wrong to choose match 2. To see why, think of correlations and joins as for-loops, where the correlated or the join QNCs act as the iteration variables. So, in FIG. 13, both the query and the AST act like a 2-level nested loop, with X and Y as the inner iteration variables, Z and W as the outer iteration variables, and the subqueries under Q2 and A2 as the bodies of the iteration. As a result, translating X to W is, in effect, similar to replacing a reference to the inner iteration variable with a reference to the outer iteration variable inside the body of the nested iteration.

Unfortunately, due to the bottom-up nature of the navigator function, it is not possible to know during the matching of Q with A whether X (or Y or W) is the inner or the outer iteration variable. However, as explained below, this distinction is possible at a later stage, when the system tries to match the parent box of a correlated QNC (i.e., PQ with PA in the example). So, an approach to resolve this ambiguity is to initially use any one of the available matches, record which match were used, and at the appropriate later stage, detect if the match used was the correct one, and if not, backtrack and try another match. This approach is described in more detail in the rest of this section.

Figure 14:
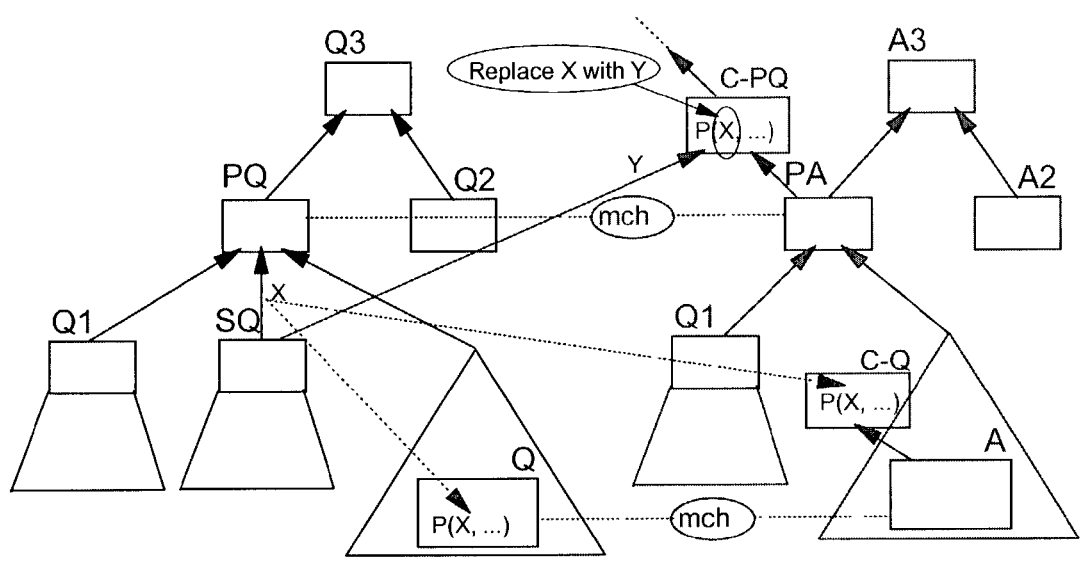

Let Q be a query box that is being matched with an AST box A. Let X be a query QNC that is produced by box SQ and is referenced via correlation by expression P( . . . , X, . . . ) in Q. To translate the reference to X in P, pick any AST box, say SA, that matches with SQ, is not the root of the AST, and is not a descendant of A, and use the method of section 4.4.2 above to translate X into an equivalent (matching) AST QNC Y. If no such box SA exists, X is translated into itself. This is the same as if X was a rejoin QNC, and indeed, the source of the correlation (box SQ) will be a rejoin child during the matching of its parent (this situation is illustrated by the example of FIG. 14). The system then records the fact that it mapped X to Y. To do so, the system maintains in the match structure between Q and A, a list of all the QNCs that are referenced via correlation in Q and their matching QNCs in the AST. This is known as the correlation mappings list. Furthermore, the system marks the match between Q and A as "conditional", because the system does not know yet if Y is the correct mapping for X.

Now, let PQ and PA be ancestors of Q and A respectively (or any other candidate subsumee/subsumer pair, for that matter). When PQ and PA are matched, the following actions specific to correlation matching take place. First, the system checks whether any children of PQ and PA have been matched conditionally. If so, the system creates a correlation mappings list for the PQ-PA match by unioning together the correlation mapping lists of all the conditional matches among children of PQ and PA. The system then lets the match function do its usual work, testing all the other relevant matching conditions and building the appropriate compensation (which may add more entries into the correlation mappings list). Assuming the match is successful so far, the following additional checks and actions are performed at the end of the matching function for every entry (X, Y) of the correlation mapping list:

1. If Y is not the same as X, then
2. If both X and Y are produced by matching children of PQ and PA respectively, then the (X, Y) entry is removed from the correlation mappings list. Using the for-loop analogy, the fact that QNC X is produced by a child of PQ means that PQ represents the "for-loop" where the "iteration variable" is declared. The same is true about Y and PA. So, condition 2 implies that the translation of X to Y (in the context of the Q-A and PQ-PA matches) was correct because X and Y are iteration variables in matching for-loops. Furthermore, this check does not need to be repeated when we pullup the PQ-PA match, which is why the (X, Y) entry is removed from the list.
3. Else if either X or Y (but not both) is produced by a child of PQ or PA respectively, then the match between PQ and PA fails. Using the same reasoning as in condition 2, condition 3 implies that X and Y are at different levels of loop nesting, and as result, the match between PQ and PA must fail. If, however, PQ has not already been matched successfully with some other AST box, we can backtrack to the original match that caused the inclusion of the (X, Y) entry in the correlation mappings list (that was the Q-A match m the example of FIG. 13), and try an alternative translation of X to another equivalent AST QNC (if any). However, before trying an alternative translation for X, all the intermediate conditional matches that were created under the assumption that X matches with Y must be dropped.
4. Else
5. If X is produced by a child of PQ, then (see FIG. 14 for an illustration of this case) let box SQ be the source of X. Then, SQ is a rejoin child of PQ. As a result, the bottom box in the PQ-PA compensation (box C-PQ, in FIG. 14) joins back to SQ. This implies further, that there is a QNC Y that belongs to the rejoin quantifier and is equivalent to X:Y is the QNC that is associated with the same QCL in SQ as A). Having located Y, we replace any reference to X inside the PQ-PA compensation with a reference to Y. We can then remove the (X, X) entry from the correlation mappings list.
6. If the correlation mappings list is not empty, then the match between PQ and PA is marked as conditional.

Notice that the correlation property mentioned in section 7.1 guarantees that, for any entry (X, Y) with Y not the same as X, either condition 2 or condition 3 will be satisfied at some point. In particular, the system is guaranteed to reach the parent box of at least X or Y, at which point the original assumption to match X with Y will be verified, positively or not.

Figure 15:
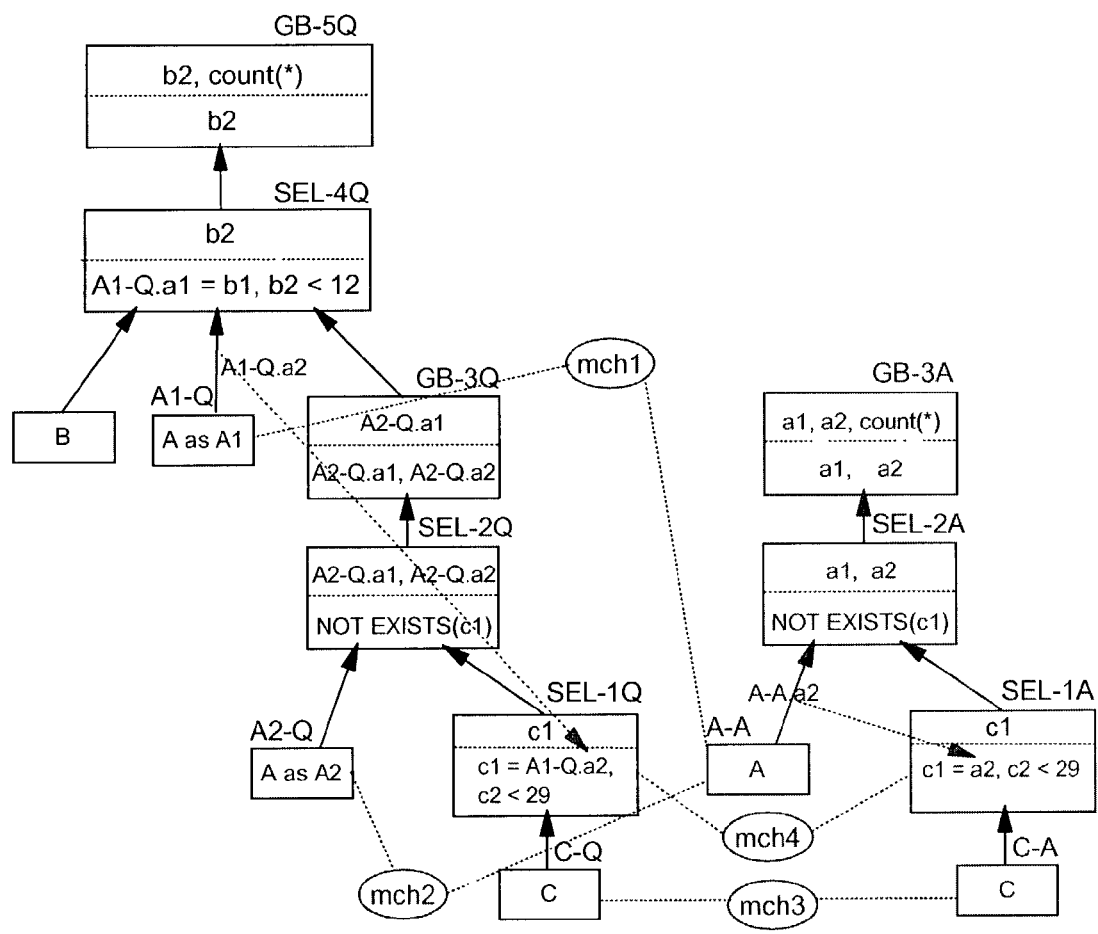

As a concrete example of the extensions described in this section, consider the pair of AST and query shown in FIG. 15. The SQL statements for the query and AST follow:

Query:
select b2, count(*)
from A as A1, B where A1.a1=b1 and b2<12 and
B1 IN (select A2.a1
  from A as A2
  where NOT EXISTS (select c1 from C where
    c1=A1.a2 and c2<29)
  group by A2.a1, A2.a2)
group by b2;
AST:
select a1, a2, count(*)
from A
where NOT EXISTS (select c1 from C where c1=A1.a2
  and c2<29)
group by a1, a2

The AST looks identical to the IN subquery of the query. Both the AST and the IN subquery have a correlated reference to the a2 column of table A. The difference, however, is that in the query, the NOT EXISTS subquery receives its correlation from 2 levels up (i.e., from the A1 instance of table A), whereas in the AST, the source of the correlation is one level up only. Without condition 3 of this section, the system would get a match between the AST and the IN subquery, resulting in the following wrongly rewritten query:

select b2, count(*)
from A, B
where a1=b1 and b2 12 and
b1 IN (select a1 from AST)
group by b2

To see how the matching algorithm avoids this wrong rewrite, consider the QGM graphs in FIG. 15. As usual, the base tables are matched first, resulting in matches 1, 2, and 3. Next, boxes SEL-1Q and SEL-1A are matched. SEL-1Q has a correlated reference to QNC A1-Q.a2. The source of that QNC (box A1-Q) matches with box A-A only, so A1-Q.a2 gets translated as A-A.a2. Under this translation, SEL-1Q and SEL-1A match exactly (match4). However, the entry (A1-Q.a2, A-A.a2) will be added to the correlation mappings list of match4, and that match will be marked as conditional. After match4, the next pair to match is SEL-2Q and SEL-2A. Although these boxes match exactly, condition 3 will fire at the end of the match function, because SEL-2A is the parent of QNC A-A.a2 in the (A1-Q.a2, A-A.a2) entry.

As a result, the match between SEL-2Q and SEL-2A will fail, thus avoiding the above wrong query rewrite.

5.2.3 Pulling Up Correlated Predicates

Section 4.4.1 above stated the condition for pulling predicates from the child compensation up through a GROUP-BY subsumer, and also explained when the system needs to regroup in the parent compensation depending on the exact nature of the pulled up predicates. The discussion there covered predicates that reference either rejoin columns or columns coming from the child subsumer (or both). What about predicates that reference correlated columns? This section first gives an example that illustrates what the system has to be careful about in the presence of correlation, and then states the extended pullup condition and associated compensation that cover correlated predicates.

Figure 16:
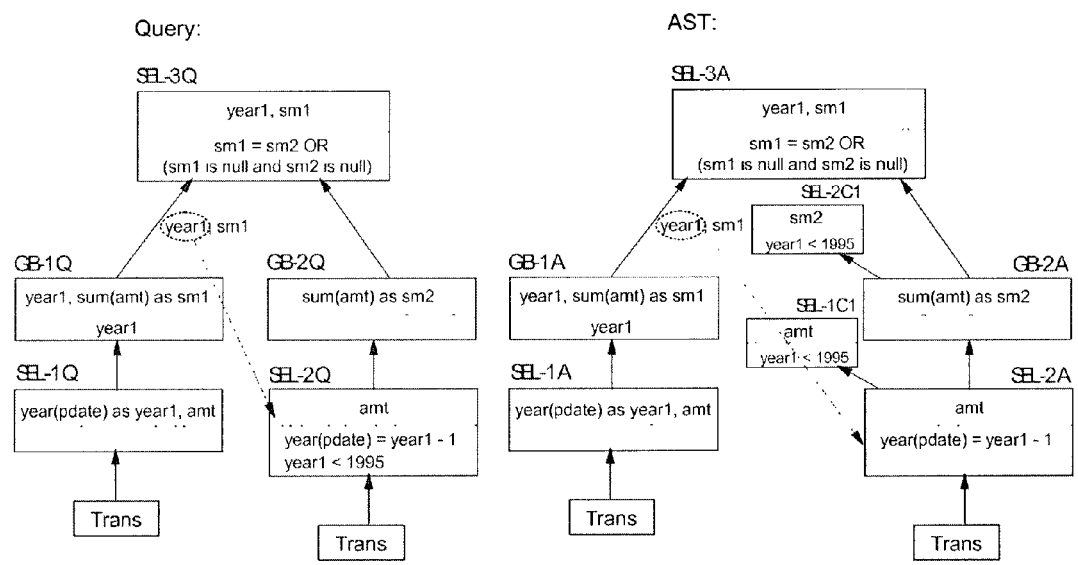

Consider the example of FIG. 16, which illustrates a query and an AST. The SQL statements for the query and AST follow:

Query:
select year1, sm1
from (select year(pdate), sum(amt)
  from TRANS
  group by year(pdate)) as T1(year1, sm1),
  (select sum(amt)
   from TRANS
   where year(pdate)=year1 −1 and year1<1995) as
   T2(sm2)
where sm1=sm2 OR (sm1 is null and sm2 is null)
AST:
select year1, sm1
from (select year(pdate), sum(amt)
  from TRANS
  group by year(pdate)) as T1(year1, sm1),
  (select sum(amt)
   from TRANS
   where year(pdate)=year1 −1) as T2(sm2)
where sm1=sm2 OR (sm1 is null and sm2 is null)

As shown, the query and the AST are almost the same—their only difference is the extra correlated query predicate "year1<1995" in box SEL-2Q. When the system matches SEL-2Q with SEL-2A, this extra predicate is placed in the compensation (SEL-1C1). The question is whether the system can pullup this compensation through the next level of matching, i.e., when the system tries to match GB-2Q with GB-2A. It is certainly possible to do the pullup, because the predicate does not need any columns from the subsumer box. Furthermore, there is no rejoin and neither the subsumee nor the subsumer have any grouping columns. As a result, according to section 4.4.1 above, no regrouping is required in the compensation. If the system lets the matching algorithm continue, then the system will rewrite the query as follows:

select year1, sm1 from AST where year1<1995

This rewrite is wrong! For example, let the TRANS table contain the following data:

| | | | |
|---|---|---|---|
| 1 | 'Jan. 01, 2001' | 1000 | |
| 2 | 'Jan. 02, 2001' | 1020 | |
| 3 | 'Jan. 03, 2001' | 1320 | |
| 5 | 'Jan. 01, 2000' | 1100 | |
| 6 | 'Jan. 02, 2000' | 1220 | |
| 7 | 'Jan. 03, 2000' | 1420 | |
| 9 | 100 | 'Jan. 01, 1995' | null |
| 10 | 100 | 'Jan. 02, 1995' | null |
| 11 | 100 | 'Jan. 03, 1995' | null |
| 13 | 100 | 'Jan. 01, 1994' | 1100 |
| 14 | 100 | 'Jan. 02, 1994' | 1220 |
| 15 | 100 | 'Jan. 03, 1994' | 1420 |
| 17 | 100 | 'Jan. 01, 1990' | null |
| 18 | 100 | 'Jan. 02, 1990' | null |
| 19 | 100 | 'Jan. 03, 1990' | null |

With these data, the AST contains just one row: (1990, null), whereas the result of the query contains 2 rows: (1995, null) and (1990, null). Obviously, the rewritten query does not give the same result as the original, and there is no other way to derive the result of the query from the AST, because the AST does not contain the necessary information.

The error with the above rewrite occurred when the system pulled the correlated predicate "year1<1995" up through the GB-2A box. In particular, if this predicate is false (say that year1 is 1995) and is applied before the grouping in the subquery, then the result of the subquery will be one record with sm2 set to null. Since sm1 for 1995 is also null, the predicate in the outer query block will be satisfied, and the row (1995, null) will be returned by the query. In contrast, if the system pulls up the correlated predicate above the grouping, then the result of the subquery will be the empty table, and 1995 will not be selected by the outer query block.

This anomaly is due to the semantics of grouping—if the input table is empty and there are no grouping columns, the GROUP-BY box returns one row (with a 0 value for count and null values for the other aggregate functions). If, however, there are grouping columns, then GROUP-BY returns an empty result on an empty input, and as a result, the effect of a predicate that does not reference any grouping columns is the same whether the predicate is applied before or after the grouping. To remedy the anomaly in the no-grouping-columns case, the system can add in the compensation a GROUP-BY box with no grouping columns, if any predicates have been pulled up. Another relevant observation is that as far as a correlated subquery is concerned, references to correlated QNC act exactly like constants: the values of the correlated QNCs are fixed by the caller of the subquery, and remain fixed during each computation of the subquery. With these observations in mind, the pullup condition and associated compensation from section 4.4.1, are extended as follows:

Pullup condition: Any QNC that is not a rejoin QNC, a correlated QNC, or a constant, and is referenced by a predicate in the child SELECT compensation must be derivable from the subsumer's grouping columns.

Compensation: The compensation includes a SELECT box that is the pulled up version of the SELECT child compensation. In general, this SELECT box is followed by the GROUP-BY box that performs the same grouping as the subsumee, and derives the subsumee's aggregate functions by re-aggregating the subsumer's aggregate functions. The only case when regrouping is not required in the compensation, is when all of the following conditions hold: (a) the subsumee and the subsumer have exactly the same grouping columns, or no grouping columns at all, (b) the SELECT child compensation does not perform any rejoins, or each rejoin is a 1:N join with the (intermediate) result of the join of the non-rejoin tables, and (c) the subsumee and subsumer have at least one grouping column, or there are no predicates consisting only of correlated QNCs and/or constants.

6 CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing database queries using an automatic summary table. A query is analyzed using matching and compensation tests between the query at least one correlated subquery within the query and the automatic summary table to determine whether expressions occurring in the query, but not in the automatic summary table, can be derived using the automatic summary table. If so, the query is rewritten so that the automatic summary table is used.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of optimizing a query in a computer system, the query being performed by the computer system to retrieve data from a database stored on the computer system, the method comprising the steps of:
   (a) generating an automatic summary table for use in optimizing the query;
   (b) analyzing the query using matching and compensation tests between the query, at least one correlated subquery within the query and the automatic summary table to determine whether there is a match between the query, the correlated subquery and the automatic summary table using a bottom-up traversal of boxes in query graph models (QGMs) for the query, correlated subquery and automatic summary table that tries to establish matches between the query, correlated subquery and automatic summary table, until it reaches a top of the QGM for the automatic summary table, so that expressions occurring in the query including the correlated subquery, but not in the automatic summary table, can be derived using the automatic summary table; and
   (c) rewriting the query so that the automatic summary table is used when there is a match, wherein the rewritten query is performed by the computer system to retrieve data from the database.

2. The method of claim 1, wherein the correlated subquery comprises an inner query block of the query that references one or more columns that appear in an outer query block of the query.

3. The method of claim 1, wherein the determining step further comprises the steps of:
   performing a navigator function to identify candidate subsumee and subsumer pairs from the QGMs for the query, correlated subquery and automatic summary table in an order such that the bottom-up traversal of the QGMs for the query, correlated subquery and automatic summary table is satisfied; and
   performing a match function that takes as input the candidate subsumee and subsumer pair from the QGMs for the query, correlated subquery and automatic summary table, and returns information on whether the subsumee matches with the subsumer.

4. The method of claim 3, wherein the navigator function guarantees that before an attempt is made to match a candidate subsumee and subsumer pair, all children of the pair have been matched with each other, and the sources of any correlated input columns that are referenced in the subsumee have also been matched with all of their candidate subsumers.

5. The method of claim 3, wherein the match function maps a reference by the correlated subquery to a column in the outer query block to an equivalent expression in the automatic summary table, using any one of the available matches of a source of the correlated column.

6. The method of claim 5, wherein the match function records which match was used, and at an appropriate later stage, detects whether the match used was a correct match, and if not, backtracks and tries another match.

7. The method of claim 3, wherein the match function performs regrouping when it pulls up a predicate with correlated and constant columns only though a GROUP-BY subsumer that does not have any grouping columns.

8. A computer-implemented apparatus for optimizing a query, comprising:
   (a) a computer system;
   (b) logic, performed by the computer system, for (1) generating an automatic summary table for use in optimizing the query;

(2) analyzing the query using matching and compensation tests between the query, at least one correlated subquery within the query and the automatic summary table to determine whether there is a match between the query, the correlated subquery and the automatic summary table using a bottom-up traversal of boxes in query graph models (QGMs) for the query, correlated subquery and automatic summary table that tries to establish matches between the query, correlated subquery and automatic summary table, until it reaches a top of the QGM for the automatic summary table, so that expressions occurring in the query including the correlated subquery, but not in the automatic summary table, can be derived using the automatic summary table; and (3) rewriting the query so that the automatic summary table is used when there is a match, wherein the rewritten query is performed by the computer system to retrieve data from the database.

9. The apparatus of claim 8, wherein the correlated subquery comprises an inner query block of the query that references one or more columns that appear in an outer query block of the query.

10. The apparatus of claim 8, wherein the logic for determining further comprises logic for:

performing a navigator function to identify candidate subsumee and subsumer pairs from the QGMs for the query, correlated subquery and automatic summary table in an order such that the bottom-up traversal of the QGMs for the query, correlated subquery and automatic summary table is satisfied; and performing a match function that takes as input the candidate subsumee and subsumer pair from the QGMs for the query, correlated subquery and automatic summary table, and returns information on whether the subsumee matches with the subsumer.

11. The apparatus of claim 10, wherein the navigator function guarantees that before an attempt is made to match a candidate subsumee and subsumer pair, all children of the pair have been matched with each other, and the sources of any correlated input columns that are referenced in the subsumee have also been matched with all of their candidate subsumers.

12. The apparatus of claim 10, wherein the match function maps a reference by the correlated subquery to a column in the outer query block to an equivalent expression in the automatic summary table, using any one of the available matches of a source of the correlated column.

13. The apparatus of claim 12, wherein the match function records which match was used, and at an appropriate later stage, detects whether the match used was a correct match, and if not, backtracks and tries another match.

14. The apparatus of claim 10, wherein the match function performs regrouping when it pulls up a predicate with correlated and constant columns only though a GROUP-BY subsumer that does not have any grouping columns.

15. An article of manufacture embodying logic for performing a method for optimizing a query, the query being performed by a computer system to retrieve data from a database stored in a data storage device coupled to the computer system, the method comprising the steps of:

(a) generating an automatic summary table for use in optimizing the query;

(b) analyzing the query using matching and compensation tests between the query, at least one correlated subquery within the query and the automatic summary table to determine whether there is a match between the query, the correlated subquery and the automatic summary table, so that expressions occurring in the query including the correlated subquery, but not in the automatic summary table, can be derived using the automatic summary table using a bottom-up traversal of boxes in query graph models (QGMs) for the query, correlated subquery and automatic summary table that tries to establish matches between the query, correlated subquery and automatic summary table, until it reaches a top of the QGM for the automatic summary table; and (c) rewriting the query so that the automatic summary table is used when there is a match, wherein the rewritten query is performed by the computer system to retrieve data from the database.

16. The article of manufacture of claim 15, wherein the correlated subquery comprises an inner query block of the query that references one or more columns that appear in an outer query block of the query.

17. The article of manufacture of claim 15, wherein the determining step further comprises the steps of:

performing a navigator function to identify candidate subsumee and subsumer pairs from the QGMs for the query, correlated subquery and automatic summary table in an order such that the bottom-up traversal of the QGMs for the query, correlated subquery and automatic summary table is satisfied; and performing a match function that takes as input the candidate subsumee and subsumer pair from the QGMs for the query, correlated subquery and automatic summary table, and returns information on whether the subsumee matches with the subsumer.

18. The article of manufacture of claim 17, wherein the navigator function guarantees that before an attempt is made to match a candidate subsumee and subsumer pair, all children of the pair have been matched with each other, and the sources of any correlated input columns that are referenced in the subsumee have also been matched with all of their candidate subsumers.

19. The article of manufacture of claim 17, wherein the match function maps a reference by the correlated subquery to a column in the outer query block to an equivalent expression in the automatic summary table, using any one of the available matches of a source of the correlated column.

20. The article of manufacture of claim 19, wherein the match function records which match was used, and at an appropriate later stage, detects whether the match used was a correct match, and if not, backtracks and tries another match.

21. The article of manufacture of claim 17, wherein the match function performs regrouping when it pulls up a predicate with correlated and constant columns only though a GROUP-BY subsumer that does not have any grouping columns.

* * * * *